(12) United States Patent
Maes

(10) Patent No.: US 11,159,385 B2
(45) Date of Patent: Oct. 26, 2021

(54) TOPOLOGY BASED MANAGEMENT OF SECOND DAY OPERATIONS

(71) Applicant: HEWLETT PACKARD ENTERPRISE DEVELOPMENT LP, Houston, TX (US)

(72) Inventor: Stephane H. Maes, Fremont, CA (US)

(73) Assignee: Micro Focus LLC, Santa Clara, CA (US)

( * ) Notice: Subject to any disclaimer, the term of this patent is extended or adjusted under 35 U.S.C. 154(b) by 358 days.

(21) Appl. No.: 15/515,719

(22) PCT Filed: Sep. 30, 2014

(86) PCT No.: PCT/US2014/058343
§ 371 (c)(1),
(2) Date: Mar. 30, 2017

(87) PCT Pub. No.: WO2016/053306
PCT Pub. Date: Apr. 7, 2016

(65) Prior Publication Data
US 2017/0302537 A1    Oct. 19, 2017

(51) Int. Cl.
*H04L 12/24* (2006.01)
*H04L 29/06* (2006.01)

(52) U.S. Cl.
CPC ........ *H04L 41/145* (2013.01); *H04L 41/0883* (2013.01); *H04L 41/0893* (2013.01); *H04L 41/12* (2013.01); *H04L 29/06* (2013.01)

(58) Field of Classification Search
CPC ................................ H04L 67/10; H04L 41/12
USPC ....................................................... 709/219
See application file for complete search history.

(56) References Cited

U.S. PATENT DOCUMENTS

| 7,734,761 | B2 | 6/2010 | Jai et al. |
| 8,086,707 | B2 | 12/2011 | Clement et al. |
| 10,346,443 | B2 | 7/2019 | Gupte |
| 2004/0143753 | A1* | 7/2004 | Hernacki ............... H04L 63/14 726/25 |
| 2007/0013948 | A1 | 1/2007 | Bevan |

(Continued)

FOREIGN PATENT DOCUMENTS

| CN | 10148901 A | 7/2009 |
| CN | 102725733 A | 10/2012 |

(Continued)

OTHER PUBLICATIONS

EP Extended Search Report; 14903207.0-1216 | 3202085 PCT/US2014058343; dated Mar. 15, 2018; 152 pages.
International Search Report & Written Opinion received in PCT Application No. PCT/US2014/058343, dated Jun. 10, 2015, 14 pages.

(Continued)

*Primary Examiner* — Suraj M Joshi

(57) ABSTRACT

In one implementation, a method for topology based management of second day operations can include identifying a cloud service operating on a second system, discovering, via a first system, an existing realized topology of the second system as an inferred realized topology for the first system, wherein the existing realized topology is provisioned by the second system, defining a management process to be performed within the cloud service, via the first system, upon the instantiation of the inferred realized topology by the first system, and executing the management process utilizing the first system.

20 Claims, 10 Drawing Sheets

(56) References Cited

U.S. PATENT DOCUMENTS

| | | | |
|---|---|---|---|
| 2010/0110933 A1* | 5/2010 | Wilcock | G06Q 10/10 370/255 |
| 2010/0125844 A1 | 5/2010 | Mousseau et al. | |
| 2011/0161952 A1 | 6/2011 | Poddar et al. | |
| 2012/0180035 A1* | 7/2012 | Poddar | G06F 16/583 717/168 |
| 2012/0239792 A1 | 9/2012 | Banerjee et al. | |
| 2013/0031224 A1 | 1/2013 | Nachtrab et al. | |
| 2013/0091285 A1 | 4/2013 | Devarakonda et al. | |
| 2013/0212129 A1* | 8/2013 | Lawson | G05B 19/4185 707/779 |
| 2013/0283364 A1 | 10/2013 | Chang | |
| 2013/0346619 A1* | 12/2013 | Panuganty | H04L 41/12 709/226 |
| 2014/0068075 A1* | 3/2014 | Bonilla | H04L 41/0823 709/226 |
| 2014/0282525 A1 | 9/2014 | Sapuram | |
| 2015/0326579 A1 | 11/2015 | Chandwani | |
| 2016/0048408 A1 | 2/2016 | Madhu et al. | |

FOREIGN PATENT DOCUMENTS

| | | |
|---|---|---|
| EP | 1821487 A1 | 8/2007 |
| JP | 2013-516668 | 5/2013 |
| WO | W02014088537 A1 | 7/2012 |
| WO | WO-2012100092 A2 | 7/2012 |
| WO | WO-2013109274 | 7/2013 |
| WO | WO-2013/184134 | 12/2013 |
| WO | WO-2014/007811 | 1/2014 |
| WO | WO-2014/058411 | 4/2014 |
| WO | WO-2014088537 A1 | 6/2014 |

OTHER PUBLICATIONS

Mihailescu, M. et al., "Enhancing Application Robustness in infrastructure-as-a-service Clouds," (Research Paper), Jul. 27-30, 2011, IEEE, 6 pages.

DMTF, "Cloud Infrastructure Management Interface (CIMI)", Distributed Management Task Force Technical Note, (Web Page), Oct. 2012, 3 pages.

* cited by examiner

TOPOLOGY BASED MANAGEMENT OF SECOND DAY OPERATIONS

BACKGROUND

An increasingly larger number of business entities and individuals are turning to cloud computing and the services provided through a cloud computing system in order to, for example, sell goods or services, maintain business records, and provide individuals with access to computing resources, among other cloud-related objectives. Cloud computing provides consumers of the cloud with scalable and pooled computing, storage, and networking capacity as a service or combinations of such services built on the above. A cloud may be designed, provisioned, deployed, and maintained by or for the entity for which the cloud computing system is created. Designing, provisioning, deploying, and maintaining a cloud computing system may be a difficult task.

DETAILED DESCRIPTION

Figure 1:
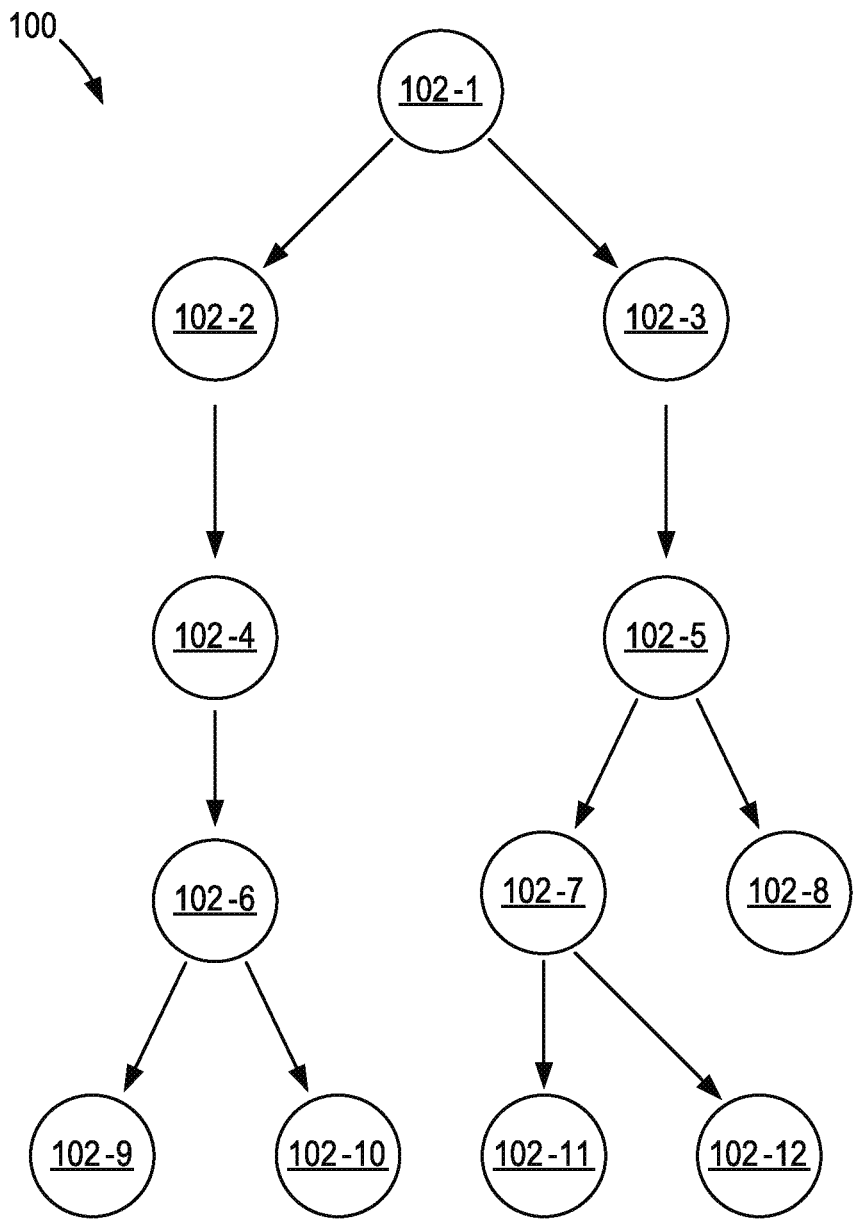
FIG. 1 is a block diagram of a blueprint, according to the present disclosure.

Cloud computing systems can provide services to users while utilizing a topology with a number of instances. Previous systems and method can require a topology that is known and/or provisioned by the system. For example, previous systems can rely on provisioning a topology and managing the provisioned topology from the system. In some embodiments, it can be advantageous to manage a topology that is not generated by the system. The methods and systems described herein can provide capabilities for discovering and managing topologies (e.g., inferred realized topology) that were not generated by the system. In some embodiments, the system is enabled by a separation of topology design, topology models, and topology templates from realized topology instances. The system can manage a realized instance for which it does not have the model and/or the design. In addition, the system can allow the realized topology to be imported, discovered, and/or modified from an external system and keep track of the realized topologies for managing the realized topologies.

Cloud computing provides services for a user's data, software, and computation. Applications deployed on resources within the cloud service may be manually deployed. This manual deployment consumes considerable administrative time. The manual steps of deploying an application may include the provisioning and instantiation of the infrastructure. This may include linking the installation of an application or a platform such as middleware and DB+ applications or deployment of an image with or without the full knowledge of the deployed infrastructure. Manual deployment may further include numerous sequences of steps launched by a user who attempts to deploy the application. Thus, the manual linking of an application to a deployed infrastructure consumes large amounts of computing and personnel resources, and may lead to mistakes and irreconcilable issues between the application and the underlying infrastructure. Linking of an application to a deployed infrastructure may be automated with a number of tools, scripts, and executables, with orchestrators automating the sequence of execution of these processes. A number of devices used in the designing, provisioning, deploying, and maintaining of applications deployed on resources within the cloud service may include data centers, private clouds, public clouds, managed clouds, hybrid clouds, and combinations thereof.

More specifically, cloud services provided to users over a network may be designed, provisioned, deployed, and managed using a cloud service manager. The cloud service provider or other entity or individual designs, provisions, and may deploy the cloud service. The cloud service manager manages such a cloud service that appropriately consists of a number of services, applications, platforms, or infrastructure capabilities deployed, executed, and managed in a cloud environment. These designs may then be offered to user who may order, request, and subscribe to them from a catalog via a market place or via an API call, and then manage the lifecycles of a cloud service deployed based on the designs through the same mechanism. A cloud service provider (e.g., first day operation) and cloud service manager (e.g., second day operation) may be a same or different entity. The service designs in a cloud service manager such as CLOUD SERVICE AUTOMATION (CSA) designed and distributed by Hewlett Packard Corporation, described in more detail below, are expressed with "blueprints."

Blueprints describe services in terms of the collections of workflows that are to be executed to provision or manage all the components that make up the service in order to perform a particular lifecycle management action. Some of the functions of the workflows defined by blueprints are actual life cycle management actions that are then performed as calls to a resource provider. The resource provider converts the calls into well formed and exchanged instructions specific to the particular resource or instance offered by a resource provider.

FIG. 1 is a block diagram of a blueprint (100), according to one example of the principles described herein. Each object (102-1, 102-2, 102-3, 102-4, 102-5, 102-6, 102-7, 102-8, 102-9, 102-10, 102-11, 102-12) in the blueprint may be associated with action workflows that call resource providers. A number of challenges exist with a blueprint (100) approach to designing, provisioning, deploying, and managing cloud services. The structure of a blueprint, while consisting of objects comprising properties and actions linked by relationships, do not identify relationships to physical topologies such as, for example, the actual physical architecture of the system that supports the cloud service. This renders it difficult to associate additional metadata with the blueprints (100) to describe, for example, policies associated with the system. Further, this association of policies with nodes in a blueprint (100) is not intuitive for a designer or administrator of the to-be-deployed cloud service.

Further, the structures of blueprints (100), for the same reason, are difficult to use as models of applications or templates of infrastructures as CONTINUOUS DELIVERY AUTOMATION (CDA) does. CDA is system tool utilized within a topology designer that independently models infrastructure and application requirements while managing versions, configurations, and other application components. CDA is also developed and distributed by Hewlett Packard Corporation. The structures of blueprints (100), for the same reason given herein, are difficult to use as models of applications because blueprints do not describe the architecture of the application. Further, blueprints are difficult to use as templates of an infrastructure because they also do not describe the architecture of the infrastructure. As a result, systems aiming at modeling application models and infrastructure or platform templates, and mapping the application models and infrastructure or platform templates to each other are not easily reconciled with the blueprints because they are based on different methods of modeling these services.

Figure 2:
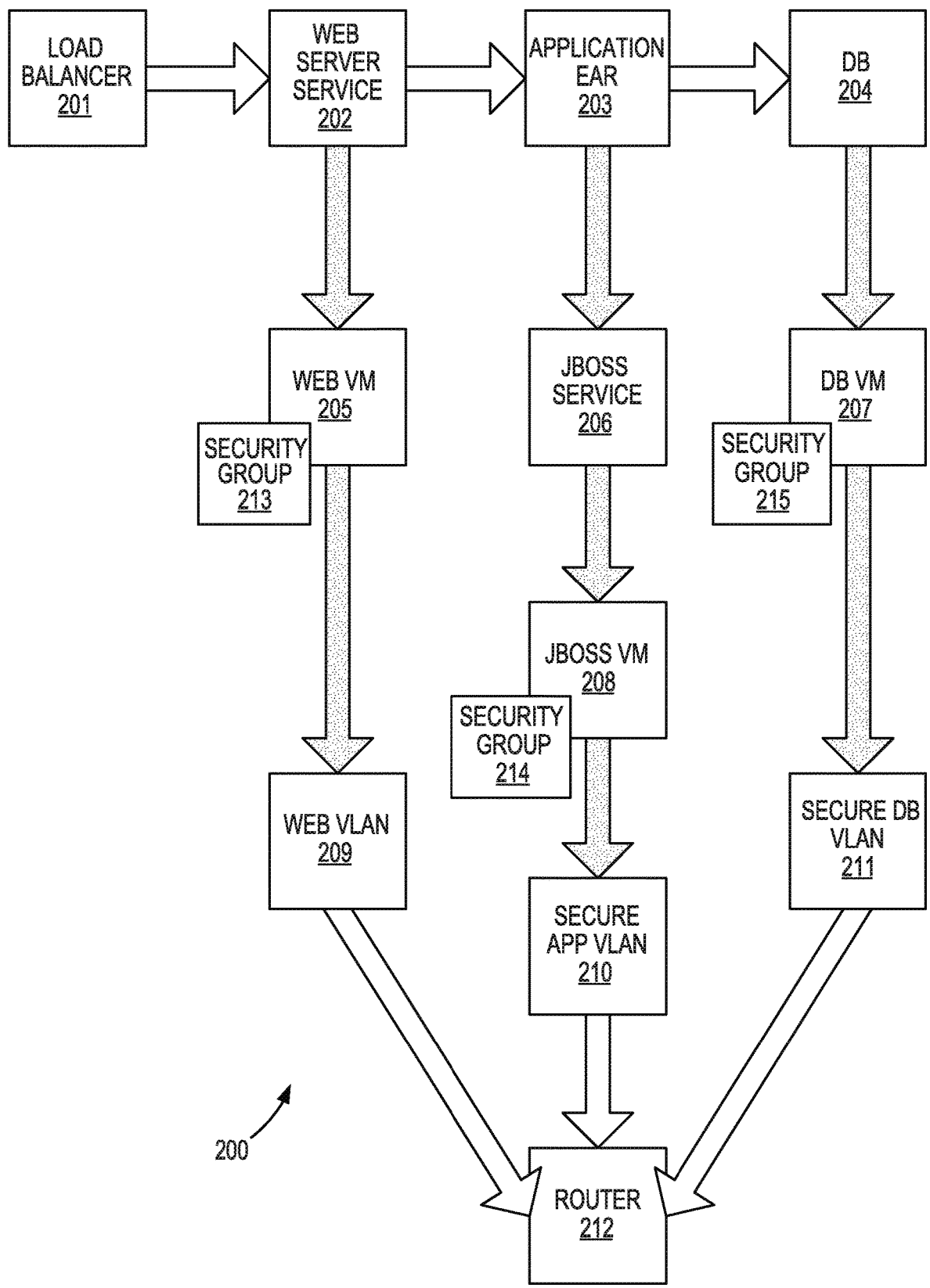
FIG. 2 is a block diagram showing an architecture derived topology, according to the present disclosure.

The present systems and methods describe architecture-descriptive topologies that define the physical architecture of a system that constitutes a cloud service. FIG. 2 is a block diagram showing an architecture derived topology (200), according to one example of the principles described herein. As depicted in FIG. 2, the architecture derived topology (200) may comprise a number of nodes (201, 202, 203, 204, 205, 206, 207, 208, 209, 210, 211, 212, 213, 214, 215) associated with one another. Associations between nodes within the topology (200) are indicated by the open arrows. A number of nodes (201, 202, 203, 204, 205, 206, 207, 208, 209, 210, 211, 212, 213, 214, 215) within the topology (200) may also be aggregated with one another as designated by the filled arrows. Aggregation is a computing term used to describe combining (aggregating) multiple network connections in parallel to increase throughput beyond what a single connection could sustain, and to provide redundancy in case one of the links fails.

For example, the load balancer (201), web server service (202), application enterprise archive (203), and the database (204) are associated with one another. The web server service (202) is aggregated with a web virtual machine (205) and its security group (213) as well as a web virtual local area network (209). Similarly, the application enterprise archive (203) is aggregated with an application server service such as the JavaBeans Open Source Software Application Server (JBoss) service (206), a JBoss virtual machine (208) and its associated security group (214), and a secure application virtual local area network (210). Again, similarly, the database (204) is aggregated with a database virtual machine (207) and its security group (215), and a secure database virtual local area network (211). The web virtual local area network (209), secure application virtual local area network (210), and secure database virtual local area network (211) are then associated with a router (212).

Thus, a cloud service based on an instantiation of the architecture derived topology (200) may be expressed as a topology of nodes with a number of relationships defined between a number of nodes within the topology. A number of properties and actions are associated with a number of the nodes, a number of groups of nodes, a portion of the topology, the topology as a whole, or combinations thereof. Further, a number of policies are associated with the number of the nodes, a number of groups of nodes, a portion of the topology, the topology as a whole, or combinations thereof. Still further, a number of lifecycle management actions (LCMAs) are associated with the number of the nodes, a number of groups of nodes, a portion of the topology, the topology as a whole, or combinations thereof.

Thus, the present systems and methods describe a cloud service broker or manager that supports both topologies and blueprints while using the same lifecycle management engine. The lifecycle management engine, described in connection with FIG. 3, supports lifecycle management of cloud services, and mapping of application models with infrastructure templates. The present systems and methods also describe a policy-based framework for managing the provisioning, deployment, monitoring, and remediation processes within a cloud service. Further, the present systems and methods provide support for usage models supported by CSA, CDA, and blueprints as will be described in more detail below.

As used in the present specification and in the appended claims, the terms "autonomous computing," "autonomic computing," is meant to be understood broadly as the self-managing characteristics of distributed computing resources that adapt to unpredictable changes while hiding intrinsic complexity to users and operators. Self-management may include self-configuration, self-optimization, self-monitoring, self-remediation, auto-provisioning, auto-remediation, or combinations thereof.

As used in the present specification and in the appended claims, the term "broker" is meant to be understood broadly as any computing device or a collection of computing devices in a network of computing devices that manages the designing, provisioning, deployment of a topology within the cloud, and the maintenance and life cycle management of (an) instantiated service based on that topology.

As used in the present specification and in the appended claims, the term "cloud service" is meant to be understood broadly as any number of services provided over a number of computing devices that are connected through a real-time communication network. Cloud services may include services provided on a distributed system implementing distributed hardware and software resources. In one example, a cloud service may be any service offered on a private cloud, public cloud, managed cloud, hybrid cloud, or combinations thereof. In another example, a cloud service may be services provided on physically independent machines such as, for example, a data center.

As used in the present specification and in the appended claims, the term "hybrid cloud" is meant to be understood broadly as multiple unique computing clouds that are bound together to provide a number of cloud services.

Further, as used in the present specification and in the appended claims, the terms "node or "computing device" are meant to be understood broadly as any hardware device, virtual device, group of hardware devices, group of virtual devices, or combination thereof within a network. Nodes may include, for example, servers, switches, data processing devices, data storage devices, load balancers, routers, and virtual embodiments thereof, among many other types of hardware and virtual devices. Further, nodes may be representations of the hardware and virtual devices described herein before execution and instantiation of a topology of which the node is a part.

Still further, as used in the present specification and in the appended claims, the term "topology" is meant to be understood broadly as data representing a graph of nodes where branches between the nodes represent relationships between the nodes. The nodes may comprise any number of computing devices located within a network. Thus, the topology of the network may comprise the physical and logical layout of networked computing devices, and definitions of the relationships between the computing devices. A number of policies and lifecycle management actions (LCMA), defined further herein, may be associated with the topologies, portions of the topologies, nodes within the topologies, groups of nodes within the topologies, and combinations thereof.

Still further, as used in the present specification and in the appended claims, the term "blueprint" is meant to be understood broadly as an execution flow for allowing automation of cloud service deployment and life cycle management of cloud services. A blue print may include a functional description of a number of hardware and/or virtualized components included within a service such as, for example, operating systems, application stacks, databases. A blueprint may further include a functional description of the configuration and connectivity between the hardware and virtualized components. The blueprints may also include a number of deployment models to enable the functional description to be deployed. The blueprints may further include a set of user-configurable options to allow a user to configure a number of optional examples of the deployed service. Blueprints are an example of non architecture derived executable topologies.

Still further, in addition to the blueprints described herein, the present disclosure provides for the utilization of executable topologies. Thus, the present systems and methods provide for the execution and instantiation of both blueprint- and architecture-derived topologies. Both blueprint- and architecture-derived topologies are executable. Thus, as used in the present specification and in the appended claims, the term "topology" is meant to be understood broadly as any set of executable logic or interpretable logic that may be expressed as executable logic that defines the characteristics of the network to be instantiated. The topology may define a number of nodes. Further, the topology may define and a number of policies and lifecycle management actions associated with the nodes as a number of groups, individually, or a combination thereof. In one example, blueprints may be expressed as topologies. In this example, the blueprint-derived topologies may also define a number of nodes and a number of policies and lifecycle management actions associated with the nodes within the topologies, groups of nodes within the topologies, portions of the topologies, the topology as a whole, and combinations thereof.

Still further, as used in the present specification and in the appended claims, the term "policy" is meant to be understood broadly as any data or metadata used to assist in the management of the provisioning, deploying, monitoring, discovering, enforcement, and remediation within a cloud service. The policies may represent a number of rules or sets of rules that are applicable to the provisioning, deploying, monitoring, discovering, enforcement, and remediation tasks associated with a number of computing devices within a cloud service environment.

Still further, as used in the present specification and in the appended claims, the term "user" is meant to be understood broadly as any individual or entity for whom or by whom a cloud service is designed, provisioned, deployed, monitored, policy enforced, incident remediated, otherwise managed, or combinations thereof. In one example, the user may purchase use of the cloud service at a cost. For example, the user may pay a subscription to use the cloud resources and services, and, in this case, also be classified as a subscriber. In another example, a user may be a designer or administrator of the cloud service. In still another example, a user may be any individual who manages the cloud service.

Even still further, as used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

The present systems may be utilized in any data processing scenario including, for example, within a network including the design, provisioning, deployment, and management of a number of computing devices within the network. For example, the present systems may be utilized in a cloud computing scenario where a number of computing devices, real or virtual, are designed, provisioned, deployed, and managed within a service-oriented network. In another example, the present systems may be utilized in a stand alone data center or a data center within a cloud computing scenario. The service oriented network may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, network, and components, among others; application program interface (API) as a service (APIaaS), other forms of cloud services, or combinations thereof. The present systems may be implemented on one or multiple hardware platforms, in which the modules in the system are executed on one or across multiple platforms. Such modules may run on various forms of cloud technologies and hybrid cloud technologies or offered as a SaaS (Software as a service) that may be implemented on or off the cloud.

Further, the present systems may be used in a public cloud network, a private cloud network, a hybrid cloud network, other forms of networks, or combinations thereof. In one example, the methods provided by the present systems are provided as a service over a network by, for example, a third party. In another example, the methods provided by the present systems are executed by a local administrator. In still another example, the present systems may be utilized within a single computing device. In this data processing scenario, a single computing device may utilize the devices and associated methods described herein to deploy cloud services and manage life cycles of the cloud services. In the examples herein, the design of the cloud service, provisioning of a number of computing devices and associated software within the cloud service, deployment of the designed and provisioned cloud resources and services, management of the cloud resources and services, and combinations thereof may be provided as the service.

Examples of the present disclosure may be embodied as a system, method, or computer program product, and may take the form of an entirely hardware embodiment, or an embodiment combining software and hardware examples that may generally be referred to herein as a "circuit," "module" or "system." Furthermore, examples of the present disclosure may take the form of a computer program product embodied in a number of computer readable mediums comprising computer readable program code embodied thereon. Any combination of one or more computer readable mediums may be utilized.

A computer readable non-transitory medium may be a computer readable storage medium in contrast to a computer readable signal medium. A computer readable storage medium may be, for example, an electronic, magnetic, optical, electromagnetic, infrared, or semiconductor system, apparatus, or device, or any suitable combination of the foregoing. More specific examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), a compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

Throughout the present disclosure, various computing devices are described. The computing devices may comprise real or virtual computing elements including data processing devices, data storage devices, and data communication devices. Although these various devices may be described in connection with real and physical devices, any number of the devices may be virtual devices. The virtual devices, although describing a software-based computer that is based on specifications of emulated computer architecture and functions of a real world computer, the virtual devices comprise or are functionally connected to a number of associated hardware devices. Accordingly, examples of the present disclosure may be implemented by hardware elements, software elements (including firmware, resident software, micro-code, etc.), or a combination of hardware and software elements.

In some examples, self-configuration may refer to the characteristic of an application to deploy itself and configure itself based on an indication or instruction to "deploy." For example, a topology may be associated with a number of policies that govern deployment and configuration. In another example, the topology may include provisioning logic that governs deployment and configuration of an application. Because the logic, policies, or combinations thereof are packaged with the topology, they can be self-deployed by a cloud management system. Such self-configuration may include executing a workflow where the actions call a number of application programming interfaces (APIs) of a cloud environment to provide a service.

In some examples, an application may be auto-provisioned. For example, an application (which may include executables, a topology, and policies associated with the topology) may be selected to be instantiated as a service. The policies may include policies that describe monitoring, event handling, incident handling and remediation topologies. The policies may be passed to a platform such as the system described in connection with FIGS. 3 and 4 to be deployed. A provisioning policy may be an input to a provisioning policy engine that may evaluate provisioning policies including capabilities and requirements with context information and resource provider policies to determine which resource provider to use to perform LCMAs. Monitoring polices are similarly described herein.

In another example, an application may be self-provisioned. In this example, APIs may be used, and built on the systems of FIGS. 3 and 4. The APIs pass executables, or installable artifacts, topologies, and policies to have the system provision and optimize the service.

Figure 3:
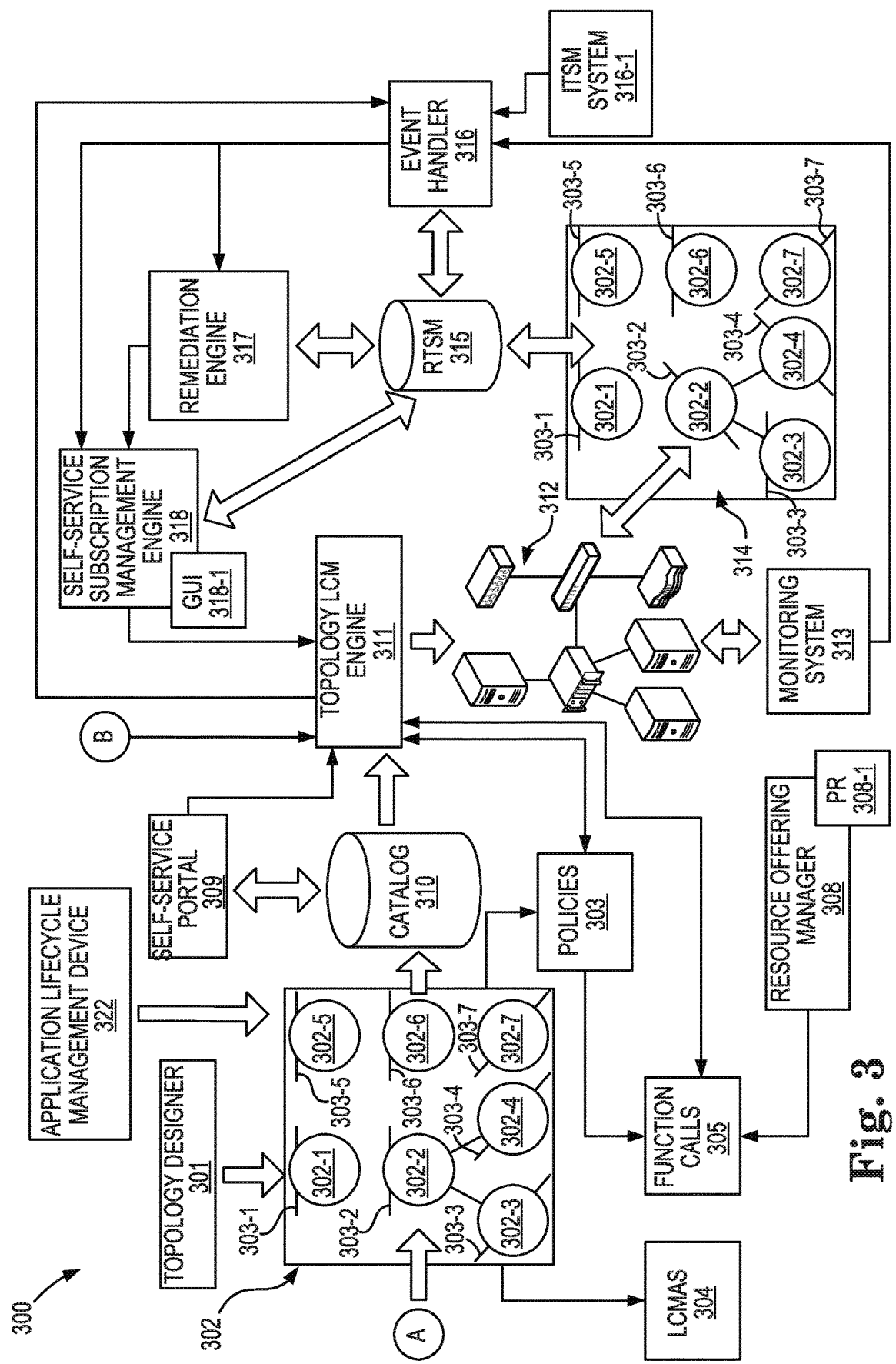
FIG. 3 depicts a block diagram showing a functional overview of a topology-based management broker for designing, provisioning, deploying, monitoring, and managing a cloud service, according to the present disclosure.
Figure 4:
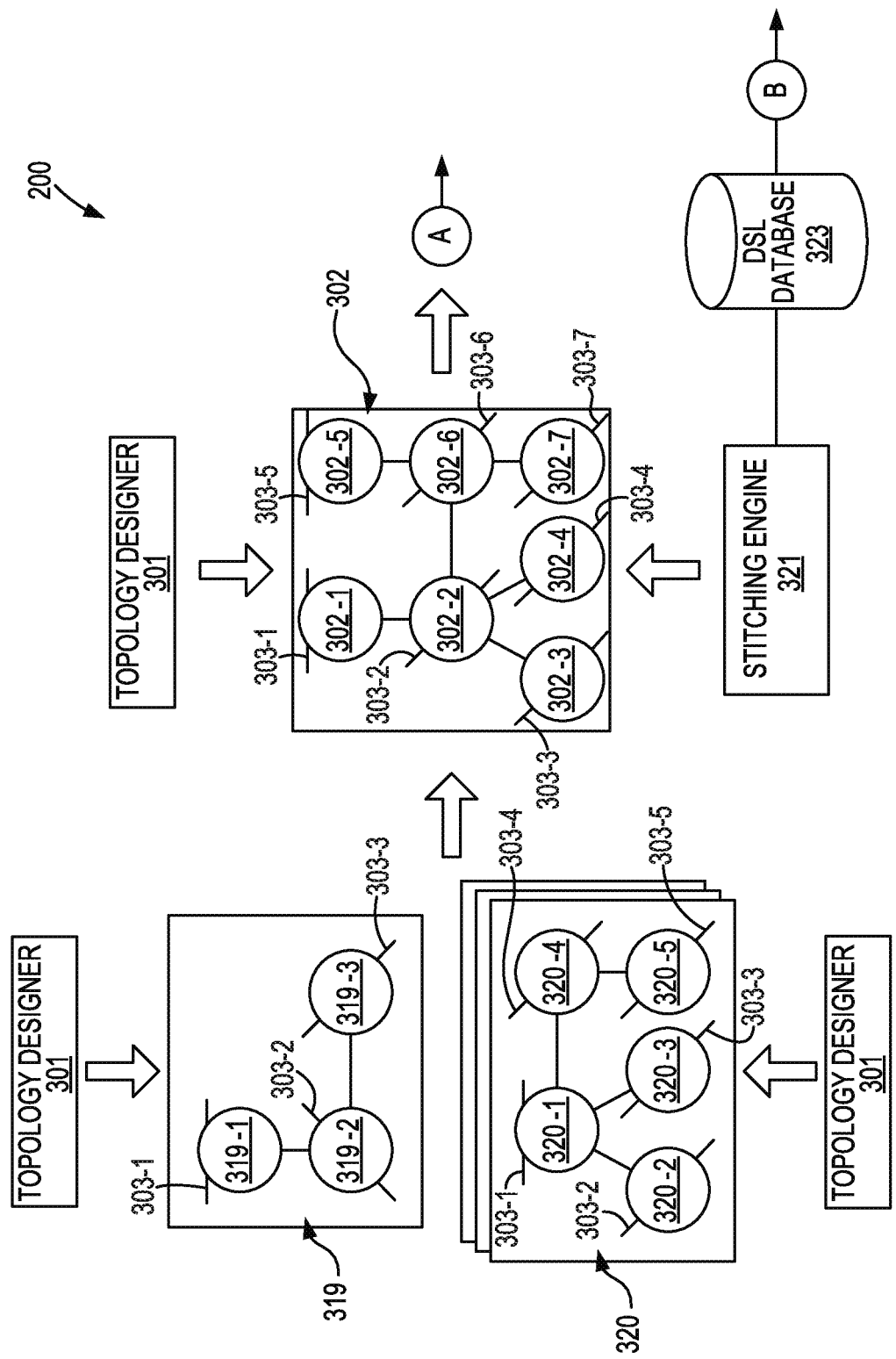
FIG. 4 depicts a block diagram showing a functional overview of a topology-based management broker for designing, provisioning, deploying, monitoring, and managing a cloud service, according to the present disclosure.

FIGS. 3 and 4 depict a block diagram of a topology-based management broker (300) along with a designing phase for provisioning, deploying, monitoring, discovering, protecting and remediating a cloud service, according to one example of the principles described herein. The system of FIGS. 3 and 4 support both topologies and blueprints while using the same lifecycle management engine as will be described in more detail below.

In one example, topologies (302) may be generated by designing a topology (302) de novo via a number of topology designers (301). In this example, a topology (302) may be designed to include a number of provisioning policies (303). The system (300) and the topology (302) may define a particular way to instantiate the service (312). Accordingly, the instantiated service (312) may be self-configuring during provisioning of the instantiated service (312). In another example, topologies (302) may be discovered using a different management tool or management broker (300). In these examples, the existing realized topology may be provisioned by another entity and/or system and be managed using a different management tool or management broker (300).

In another example, the topology (02) may be generated by stitching a number of applications models (319) and a number of infrastructure templates (320) together using a number of stitching methods. In this example, the system (300) and the application models (319) with corresponding capability policies, requirements policies, and provisioning policies may self-select the best infrastructure template (320) for the topology (302). In this example, the topology (302) may be self-designing. The topology (302) may then self-configure, or define a particular way to instantiate the service (312) as described herein.

In addition to being self-configuring, an application may be self-healing. Self-healing may refer to a service's (312) or an application's ability to monitor itself and self-remediate incidents generated based on collected data such as metrics. In some examples, self-healing may include monitoring and remediating in accordance with policies (303) included in a topology (302). In another example, self-healing may include executing remediation logic and monitoring logic included in the topology (302) itself.

Figure 5:
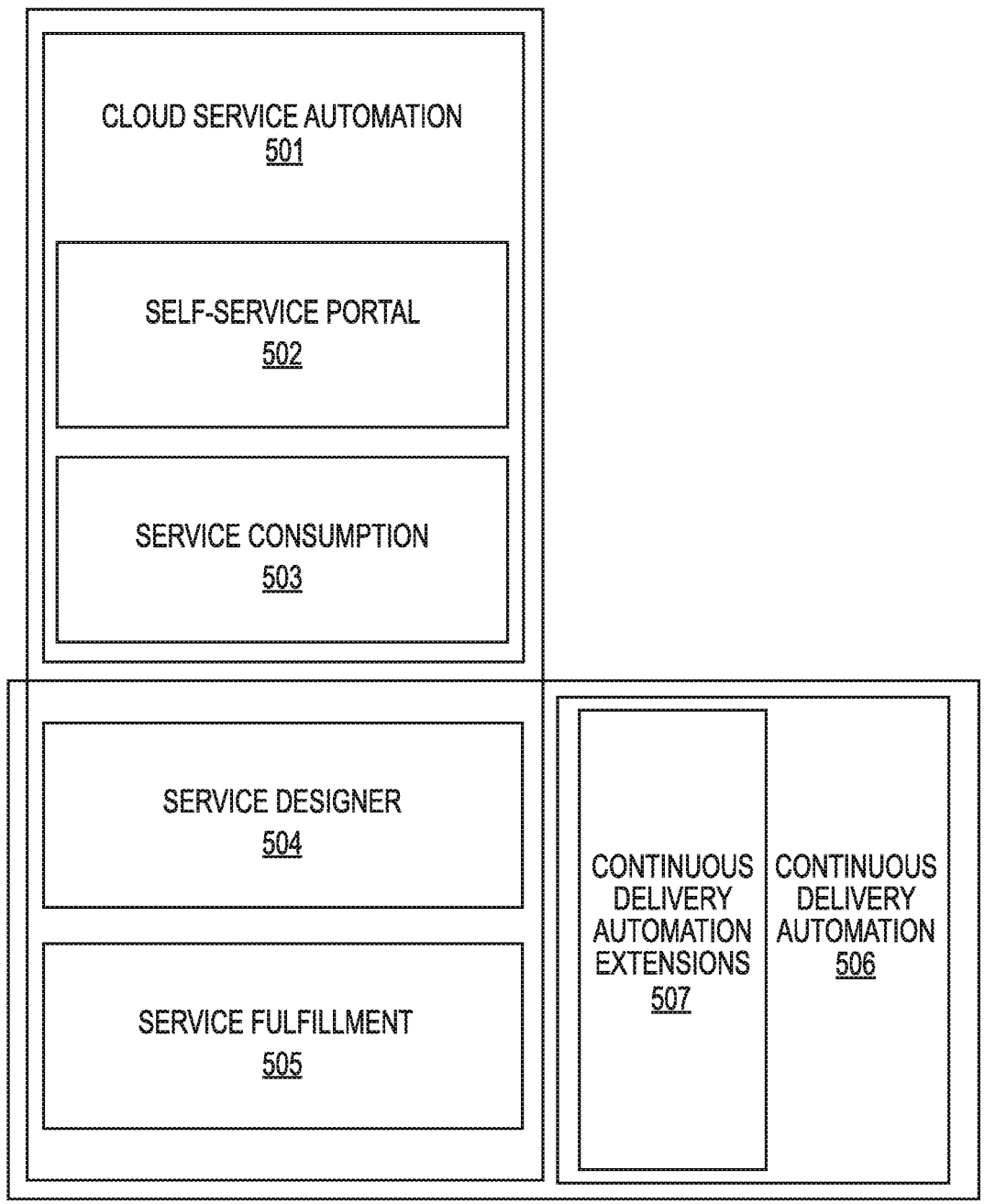
FIG. 5 depicts a block diagram showing a common platform for a topology-based management broker.

FIG. 5 is a block diagram showing a common platform (500) for topology-based management broker (300) of FIGS. 3 and 4 at a high level, according to one example of the principles described herein. As depicted in FIG. 5 a common platform for CSA (501) and CDA (506) are represented by the common use of service design aspects (504) and service fulfillment aspects (505). In the case of CSA (501), the self-service portal (502) and service consumption (503) aspects of CSA (501) use the same resources as does the CDA extension aspects (507) of CDA (506). In this manner, all use cases of instantiating a cloud service are supported by the common platform. Thus, although topologies may be designed de novo via a number of topology designers and/or via a application model and infrastructure template stitching process, the present systems and methods also provide, within the same system, execution of blueprints using the systems and methods described herein. This aspect will now be described in more detail in connection with FIGS. 3 and 4.

As depicted in FIGS. 3 and 4, one or a number of topology designers (301) contribute in designing various examples of the cloud service topology. Alternatively, a topology may be discovered as discussed more in connection with FIGS. 6-9. In one example, topology design is performed via a design tool that uses hardware devices and software modules such as graphical user interfaces (GUI) and coding scripts. A human designer designs the topology with the use of a design tool (301). Thus, the design of the topology (302) is achieved through an autonomous and/or a human-provided design method. In one example, the topology designer (301) may be an interface utilizing API's that enables separate creation of an application model (FIG. 4, 319) and its associated components along with creation of an infrastructure template (FIG. 4, 320) which specifies infrastructure and lifecycle conditions for the infrastructure. As shown in FIG. 3, in at least one example these methods are used to associate a policy to an application infrastructure, wherein the policy identifies a stage, version, and/or a compliance.

The subsystem depicted in FIG. 3 of the overall topology-based management broker (300) comprises a subsystem capable of provisioning, deploying, monitoring, discovering, enforcing policies within a cloud service, and remediating incidents within the cloud service. These tasks are all performed with the use of topologies with LCMAs and policies, whether the topologies are blueprint or architecture derived. Thus, the present systems and associated methods also support all the use cases that CSA support or other supports (e.g., cloudfoundry, heroky, openshif, Amazon Web Service (AWS) beanstalk, Azure and/or auto-remediated or modified without notification of the management broker (300)). CSA is described in International Patent App. Pub. No. PCT/US2012/045429, entitled "Managing a Hybrid Cloud Service," to Maes, which is hereby incorporated by reference in its entirety. As will be described in more detail below, the subsystem depicted in FIG. 3 uses a number of types of policies and lifecycle management actions (LCMAs) to provision, deploy, monitor, discover, enforce policies within, and remediate incidents within a deployed cloud service.

Further, the subsystem depicted in FIG. 4 of the overall topology-based management broker (300) comprises a subsystem capable of independently modeling infrastructure and application requirements of a topology on the same stack as the subsystem depicted in FIG. 3. The present systems and associated methods also support all the use cases that a CDA subsystem such as those use cases of CDA support or other supports (e.g., cloudfoundry, heroky, openshif, Amazon Web Service (AWS) beanstalk, Azure and/or auto-remediated or modified without notification of the management broker (300)). CDA is described in International Patent App. Pub. No. PCT/US2012/041625, entitled "Cloud Application Deployment," to Maes, which is hereby incorporated by reference in its entirety.

In this manner, the subsystems of FIGS. 3 and 4 work under a common stack and work together within a same and/or different topology-based management broker (300) as a computing system with an ability for common use of topologies, realized topologies, inferred topologies, inferred realized topologies, and policies to support all use cases of constructing topologies and supporting multiple providers' associated technologies. Thus, in one example, the present systems and methods reconcile the differing models, templates, and blueprints used respectively by CDA and CSA by utilizing, on a same stack and/or different stack, designed topologies (e.g., architecture derived) of a cloud service, a number of policies, and a number of LCMAs associated with the topology nodes, subsets of topology nodes, and/or full set of topology nodes.

As depicted in FIG. 3, a topology designer (301) may design and present a lifecycle management (LCM) topology (302) to the topology-based management broker (300). In one example, the topology designers (301) described herein may be an integrated part of the topology-based management broker (300). In another example, the topology designers (301) may be separate from the topology-based management broker (300). In another example, a number of persons may use the topology designers (301) to design the topologies (302). These individuals may be service designers, infrastructure architects or administrators, system administrators, information technology operators, offer managers, or users, among other personnel with roles in the design of a topology. In still another example, the topology designers (301) may be operated by a third party.

The LCM topology (302) may define a number of nodes (302-1, 302-2, 302-3, 302-4, 302-5, 302-6, 302-7), and a number of relationships between the nodes (302-1, 302-2, 302-3, 302-4, 302-5, 302-6, 302-7). Although in FIG. 3, seven nodes are depicted, any number of nodes may be designed into the topology (302) to achieve any data processing objectives. In one example, the topology-based management broker (300) may represent the topology (302) as an extensible markup language (XML) file. In another example, the topology-based management broker (300) may represent the topology (302) in JavaScript object notation (JSON) format; a text-based open standard designed for human-readable data interchange that is derived from the JavaScript scripting language for representing objects. In still another example, the topology-based management broker (300) may represent the topology (302) in YAML syntax format; a human-readable data serialization format.

In FIG. 3, the relationships between nodes (302-1, 302-2, 302-3, 302-4, 302-5, 302-6, 302-7) are depicted as lines connecting the nodes (302-1, 302-2, 302-3, 302-4, 302-5, 302-6, 302-7). Each of the nodes (302-1, 302-2, 302-3, 302-4, 302-5, 302-6, 302-7), the entire topology (302), a group of nodes (302-1, 302-2, 302-3, 302-4, 302-5, 302-6, 302-7), portions of the topology (302), or combinations thereof are associated with a number of policies (303). Policies (303) are data or metadata provided in the same file describing the nodes or topology, or in a file associated therewith. In one example, the association of the policies (303) within the topology (302) may be performed during the designing of the topology (302), by, for example, an administrator when offering the design. In another example, the association of the policies (303) within the topology (302) may be performed during the designing of the topology (302) when a user, for example, selects the design as a subscription or request.

In some embodiments, the topology (302) can be a realized topology. A realized topology can be a topology (302) that was generated by an entity that is also utilizing the topology (302). In some embodiments, the topology (302) can be an inferred realized topology. The inferred realized topology can be a topology (302) that was not created by an entity that is attempting to utilize the topology (302). The inferred realized topology can be a topology (302) that is discovered. The inferred realized topology can be discovered by examining relationships in a CMDB (configuration management database) or similar system that is able to examine relationships about deployed systems in a domain and between the deployed systems.

Discovering the inferred realized topology can be aided by enterprise map data and/or manual editing, guidance editing, and/or designing that can be done by operators knowledgeable of the data center and services deployed by the data center. In some embodiments, discovering the inferred realized topology can be aided by manual entry and/or manual design to create a number of inferred realized instances, as described herein. The inferred realized topology can be a topology (302) of cloud services that are provisioned by a system that is different than the system managing the topology (302) services. For example, the inferred realized topology can apply to a service deployed into a PaaS that is similar to cloudfoundry, heroky, openshif, Amazon Web Service (AWS) beanstalk, Azure and/or auto-remediated or modified without notification of the management broker (300). The inferred realized topology can operate and/or be utilized similarly to realized topologies. In some embodiments, a number of applications can be built on the management broker (300) for second day operation. In some embodiments, a number of applications can be built on the management broker (300) for second day operation without first day operation.

As used herein, first day operation can refer to application development on the management broker (300). Furthermore, first day operation can enable an application developer and/or topology developer to obtain a map of relationships of deployed systems of the management broker (300). As used herein, second day operation can include the operation, deployment, management, and provisioning of the cloud services after the applications of the cloud services were developed. Thus, second day operation without first day operation includes management and/or provisioning of the cloud services of the cloud services without developing the applications on the management broker (300). In some embodiments, second day operation without first day operation can be achieved by mapping a number of service instances into an inferred realized topology and utilizing the inferred realized topology in the same and/or similar way as a realized topology as described herein.

Policies (303) are data or metadata provided in the same file describing the nodes or topology, or in a file associated therewith. In one example, the association of the policies (303) within the topology (302) may be performed during the designing of the topology (302), by, for example, an administrator when offering the design. In another example, the association of the policies (303) within the topology (302) may be performed during the designing of the topology (302) when a user, for example, selects the design as a subscription or request.

In some embodiments, the policies (303) can be associated to each of the nodes (302-1, 302-2, 302-3, 302-4, 302-5, 302-6, 302-7). In some embodiments, the policies (303) can be associated to each of a number of application models (319) as referenced in FIG. 4. Furthermore, in some embodiments, the policies (303) can be associated to each of a number of infrastructure templates (320) as referenced in FIG. 4. For example, policies (303-1, 303-2, 303-3, 303-4, 303-5, 303-6, 303-7) can be assigned to the corresponding nodes (302-1, 302-2, 302-3, 302-4, 302-5, 302-6, 302-7). As described further herein, the policies (303-1, 303-2, 303-3, 303-4, 303-5, 303-6, 303-7) can include a compliance of an application.

As used herein, the compliance of an application and/or the compliance of a node is a desired state of the application and/or the desired state of the node respectively. The compliance can include policies that are provisioned by a different system. For example, the compliance can be provisioned by a first system and the topology can be managed by a second system. That is, the topology and/or system can be provisioned and/or managed separately. The policy based method and system to model compliance as described herein can support second day operation, CSA, and/or operations with cloud services that are compatible with legacy SA type of solutions.

A number of generic policies can be mapped to the topology. As described further herein, a number of generic policies (e.g., generic compliance policies) include policies such as FIPS, Security policies, and/or patching policies, among other generic policies as described herein. The generic policies can be pre-processed and mapped to the topology utilizing a number of methods such as walking the topology, identifying a node type, identifying the compliance generic policies which have a same or similar scope and/or expressing a desired state for the node.

As described further herein, notification policies can be utilized to notify a manager and/or developer of the topology and/or system. In some embodiments, the notifications can be raised and/or sent by specifying a distance between the defined desired state and an actual state of the application and/or node. In some embodiments, the notifications can be designated to be sent to a particular user and/or system based on an incident type as described in more detail below. In some embodiments, sending a notification can include identifying a script to execute when a distance between a desired state and an actual state exceeds a particular threshold.

Further, in one example, the addition of a policy (303) to the topology or portions thereof may cause the design of the topology to change. In this example, a policy (303) added to an element of the topology (302) may effect a number of other policies. For example, associating with a topology (302) a policy that indicates that a node be highly available may evolve the policies (303) and topology (302) as a whole to require, for example, a cluster of nodes. In this manner, policies may drive the design of the topology (302).

Each of the nodes (302-1, 302-2, 302-3, 302-4, 302-5, 302-6, 302-7), the entire topology (302), a group of nodes (302-1, 302-2, 302-3, 302-4, 302-5, 302-6, 302-7), portions of the topology (302), or combinations thereof are further associated with a number of lifecycle management actions (LCMAs) (304). In examples where LCMAs (304) are associated with the nodes, a single LCMA can be associated with a given node. In examples where a number of LCMAs can be associated with portions of the topology (302) or the topology (302) as a whole, the LCMAs are subjected to an orchestration of resource providers.

LCMAs are expressed as a number of application programming interfaces (APIs), wherein the LCMAs are called during execution of the topology (302), and a number of computing resources are provisioned for purposes of managing the lifecycle of a given cloud capability. In one example, the LCMAs may be accessed via uniform resource identifiers (URIs) of application programming interfaces (APIs) to perform calls in order to execute the APIs. In one example, the LCMAs are provided by reference within the file comprising the data or metadata described herein in connection with the policies (303).

In one example, the LCMAs are associated with the examples of the topology by default by virtue of what computing device the node or nodes (302-1, 302-2, 302-3, 302-4, 302-5, 302-6, 302-7) represent. In another example, the LCMAs are associated with the examples of the topology by explicitly providing a number of functions, $F_{Action}$, that define how to select a resource provider to implement the action based on the policies associated with the examples of the topology, the applications, and the policies of the different relevant resource providers. These functions define how a resource provider is selected to implement the action based on the policies associated with the example of the topology, the applications, and the policies of the different relevant resource providers.

The policies and LCMAs will be denoted herein by elements 303 and 304, respectively, to denote that the policies (303) and LCMAs (304) are associated with the nodes (302-1, 302-2, 302-3, 302-4, 302-5, 302-6, 302-7), the entire topology (302), a group of nodes (302-1, 302-2, 302-3, 302-4, 302-5, 302-6, 302-7), portions of the topology (302), the application model (319), an infrastructure template (320), or combinations thereof. In one example, the association of the policies and LCMAs with examples of the topology is performed via the topology designer (301) and/or discovered, as described in FIGS. 6-9.

In one example, although not depicted, a subset of nodes making up a group may also be associated with a number of policies (303) and a number of LCMAs (304). In this example, a number of nodes, for example, nodes (302-2, 302-3, 302-4, 302-5, 302-6, 302-7), may be associated as a group with a number of policies (303) and a number of LCMAs (304) associated therewith. Several groupings of the nodes may be present within the entire topology (302). In one example, the groups of nodes may overlap, in which a single node in a first group of nodes may also belong to a second group of nodes, and be subjected to both the first and second groups of nodes' policies (303) and LCMAs (304). Policies and their associations with individual nodes and groups of nodes will be described in more detail below.

The policies (303) associated with the nodes may be expressed and attached with the nodes in any manner (302-1, 302-2, 302-3, 302-4, 302-5, 302-6, 302-7). In one example, the policies (303) are associated with the nodes (302-1, 302-2, 302-3, 302-4, 302-5, 302-6, 302-7) by defining properties of the nodes (302-1, 302-2, 302-3, 302-4, 302-5, 302-6, 302-7). In another example, the policies (303) are associated with the nodes (302-1, 302-2, 302-3, 302-4, 302-5, 302-6, 302-7) by metalanguage expressions.

The policies (303) associated with the application models may be expressed and attached with the application models (319-1, 319-2, 319-3) in any manner (319-1, 319-2, 319-3). In one example, the policies (303) are associated with the application models (319-1, 319-2, 319-3) by defining properties of the application models (319-1, 319-2, 319-3). In another example, the policies (303) are associated with the application models (319-1, 319-2, 319-3) by metalanguage expressions.

The policies (303) associated with the infrastructure templates may be expressed and attached with the infrastructure templates in any manner (320-1, 320-2, 320-3, 320-4, 320-5). In one example, the policies (303) are associated with the infrastructure templates (320-1, 320-2, 320-3, 320-4, 320-5) by defining properties of the infrastructure templates (320-1, 320-2, 320-3, 320-4, 320-5). In another example, the policies (303) are associated with the infrastructure templates (320-1, 320-2, 320-3, 320-4, 320-5) by metalanguage expressions.

The policies (303) are a number of descriptions, metadata, workflows, scripts, rules, or sets of rules that are applicable to guiding the provisioning, monitoring, discovering, enforcement, governance, and remediation tasks associated with the lifecycle management of a number of nodes (302-1, 302-2, 302-3, 302-4, 302-5, 302-6, 302-7), a number of application models (319-1, 319-2, 319-3), and/or a number of infrastructure templates (320-1, 320-2, 320-3, 320-4, 320-5) within a cloud service environment in which the topology (302) is to be or has been implemented. The policies (303) define the access control and usage control of the APIs of the topology-based management broker (300). Further, policies (303) define the access control and usage control of the APIs used to manage or use the instantiated services. For example, when a security threat is detected by a monitoring system (313), a remediation option may comprise making changes to a number of access control policies.

The policies (303) may be associated with and operable against a number of individual nodes, a number of groups of nodes, a number of nodes of a class of nodes, a subset of the nodes within the entire topology of the cloud service; the entire topology of the cloud service as a whole, or combinations thereof. If the policies (303) are initiated on the individual nodes, groups of nodes, or the entire topology of the cloud service as a whole, the policies will guide how life cycle management actions are taken with respect to, or performed on the individual nodes, groups of nodes, nodes of a class of nodes, a subset of the nodes within the entire topology of the cloud service, or the entire topology of the cloud service as a whole.

One example of a type of policy (303) is a provisioning policy which can be associated with "first day operations". Provisioning policies may, if implemented, define the characteristics of the computing devices and/or application models (319) that comprise the cloud and cloud service when the topology is provisioned, deployed, and executed. Compliance policies and/or stage and version policies can be a part of the provisioning polices. This provisioning can include the infrastructure template 320 and platform of the topology (302). The provisioning policies may include definitions of characteristics such as, for example, the physical location of a node. Provisioning policies may also include definitions of characteristics such as, for example, a geographical or deployment type location such as a network zone, test, pre-production, production, stage, version, release, and/or patch with or without access to an internet or behind or not behind a firewall, among other geographical or deployment type provisioning policies. In this example, a policy may have a provisioning policy component that may be associated with a server device that requires the server device to be located in a particular geographic area of a country, a particular region such as, for example, the east coast of the United States versus the west coast, a particular server facility, or any other particular requirements and/or geographic location.

As to a provisioning policy that defines a physical location of the computing device, other characteristics may include, for example, the level of security of the location or access to the internet at which the node is located. Other provisioning policies may also include, for example, the speed in, for example, bandwidth of the network to which the node is coupled, whether the node is to be connected to an internet or intranet such as, for example, a demilitarized zone (DMZ) or perimeter network, whether the node is firewalled, whether the node has access to an internet, whether the node is to be located on top of another node, and whether the node is to be located on top of another node using a particular infrastructure element or platform, among other provisioning policies.

Provisioning policies may also, if implemented, rely on the requirements and capabilities of the nodes within the proposed cloud service that is based on the topology (302). Requirements define the needs of nodes (302-1, 302-2, 302-3, 302-4, 302-5, 302-6, 302-7) such as, for example, server or network needs in relation to processing, memory, and operating system (OS) needs, among other forms of needs. For example, the requirements policies may indicate that a node requires particular software or a particular software version associated with it such as a particular operating system. As another example, a requirements policy may also indicate that a particular node may require additional hardware devices associated with it such as, for example, a server device, a server group, or a high availability configuration, among others.

Capabilities such as the nature of the processors, memory, capacity, OS, middleware type and version, among others, define what each node (302-1, 302-2, 302-3, 302-4, 302-5, 302-6, 302-7), a number of application models (319-1, 319-2, 319-3), and/or a number of infrastructure templates (320-1, 320-2, 320-3, 320-4, 320-5) offers. Thus, in one example, capabilities policies (303) may indicate that a node is capable of processing data at a certain rate. In another example, a capabilities policy may indicate that a memory device may have a terabyte (TB) of data storage space.

In still another example, the requirements policies (303) may indicate that a node requires a particular computing platform, test, pre-production, production, stage, version, release, and/or patch. When designing a topology (302), the topology or association of metadata supports capturing data defining a number of hardware devices within the computing platform including hardware architecture and a software framework (including application frameworks). When the metadata is presented or associated, it is used to guide provisioning policies (303) in order to better select appropriate elements within the computing platform such as, for example, a suitable data center. The metadata, when presented or associated, may also be used to guide matching fragments of topologies to other fragments as will be discussed in more detail below in connection with stitching of application models (319) to infrastructure templates (320).

With regard to capability policies (303), the nodes may define what kind of device they are, what versions of software they capable of, or are executing, and what they can do. An example, of a capability policy may include a definition associated with the node that defines it as an application server, that it provides a Java Platform, Enterprise Edition (J2EE) environment, that it runs a particular operating system, a version of an operating system, or a particular release of a version of the operating system, among many other capabilities. As described herein, this may be used to determine, for example, what else may be deployed or what other devices may use the cloud services.

Another type of policy (303) that may be assigned includes monitoring policies. Monitoring policies are policies (303) that, if implemented, define the operational monitoring of the nodes (302-1, 302-2, 302-3, 302-4, 302-5, 302-6, 302-7), the security monitoring of the nodes, the compliance monitoring of the nodes, analytics among the nodes and groups of nodes, usage monitoring of the nodes, performance monitoring, and intelligence monitoring such as, for example, collection of metrics, business intelligence (BI) and business activity monitoring (BAM) and analytics/big data integration, among other types monitoring-related policies (303).

The monitoring policies (303) may also define what kind of monitoring is expected and how the monitoring is to be implemented. Examples of monitoring policies (303) regarding node operations include performance, monitoring CPU levels and loads of the various nodes within the network, monitoring the speed at which data is processed through a node or a number of nodes or exchanged between nodes, and monitoring the operational state of applications running on a node or nodes at any level of the network, among many other operations parameters of the nodes, group of nodes, and the cloud service as a whole.

In another example, the monitoring policies also define how monitored events that occur in an instantiated topology are handled. In this example, the monitoring policies assist an event handler (316) in receiving and processing the events, and in making decisions regarding remediation of incidents resulting from the events, and in sending notification messages regarding the incidents. The handling of events within a provisioning (e.g., first day operations) or a different (e.g., second day operations) the topology-based management broker (300) will be described in more detail below. That is, the monitoring policies include a portion that defines what to do with the monitored events that result from the monitoring such as, for example, how to handle the events, where the events are sent, what devices or individuals address the events, how incidents resulting from the processing of the events are handled, how the events and incidents are processed (e.g., processed as aggregated, filtered, or correlated events, among other forms of processing), and how the resulting incidents are handled.

Monitoring policies (303) also include monitoring policies (303) regarding security. Security policies (303) define how to monitor for abnormal behaviors or behaviors known as being associated with known or suspected security issues. Examples of monitoring policies (303) regarding security include monitoring whether a node or a group of nodes is experiencing an attack, whether there is strange behavior occurring within the cloud service or interactions with the cloud service, and whether there is a virus or other anomaly with a node or group of nodes, among other security-related monitoring policies (303).

Monitoring policies (303) also include monitoring policies (303) regarding compliance. Examples of monitoring policies (303) regarding compliance include, determinations as to whether the nodes or group of nodes are running an appropriate version of an operating system, determining whether the most recent patch associated with the release of a software program running on the nodes has been installed, determining if an installed patch is a correct patch, checking that a code or artifacts that have been used to provision the node and cloud service have been appropriately checked and vetted for any weakness or problem, if governance and access control to the node and cloud service or the node and cloud service management is appropriate, and if settings of a provisioned system match provisioning, security, or other compliance requirements such as correct logging levels, correct setup for access controls, and correct setup for passwords, among other compliance-related monitoring policies (303).

Monitoring policies (303) also include monitoring policies (303) regarding usage. Examples of monitoring policies (303) regarding usage include, determining how much a user has been using CPUs of a node or group of nodes, determining how much memory a user has utilized, determining how much money has been charged to the user, and determining whether the user has paid for the services provide through the designing, provisioning, deploying, and monitoring of the network topology, among other usage-related monitoring policies (303).

The policies (303) may further comprise governance policies (303) that, if implemented, define access controls of nodes (302-1, 302-2, 302-3, 302-4, 302-5, 302-6, 302-7) or groups of nodes within the topology (302) or the cloud service. For example, governance policies (303) may include policies (303) that define who may access the nodes within the topology (302) or the cloud service, and under what conditions may those individuals obtain such access.

The policies (303) may further comprise analytics policies (303) that, if implemented, define what is needed to ensure analytics and big data monitoring within or among the nodes (302-1, 302-2, 302-3, 302-4, 302-5, 302-6, 302-7) or groups of nodes within the topology (302), and ensure that this is occurring as expected. For example, the analytics policies (303) may define a number of workflows by which the monitoring system (313) may operate to configure the cloud service, provide analytics, collect big data, and process the data.

Still further, the policies (303) may comprise remediation policies (303) that define what actions are to take place within the topology (302) should a problem arise or an incident be raised during deployment and execution of the topology (302). Remediation policies (303) may include policies (303) that define a number of actions taken by the provisioning (e.g., first day operations) or different (e.g., second day operations) topology-based management broker (300) during remediation processes, and can include: (1) providing notifications to a user, consumer, or administrator; (2) obtaining instructions from the user, consumer, or administrator; (3) taking manual actions input by the user, consumer, or administrator; (4) taking autonomous actions after receiving instructions from the user, consumer, or administrator; (5) taking autonomous actions without receiving instructions from the user, consumer, or administrator; (6) taking autonomous actions without notifying the user, consumer, or administrator or receiving instructions from the user, consumer, or administrator; (7) proposing a remediation action to a user or administrator for approval, and performing the proposed remediation action if approved by the user or administrator, or combinations thereof.

As an example, a failure of the cloud service as instantiated realized or inferred by the topology (302) may occur, and the remediation policies (303) may define how that failure may be handled based on the potential scenarios described herein. In addition, the remediation policies (303) provide the actual rules and workflows of actions to perform to remediate the incidents under any number of conditions or indicate to whom or which device to delegate the decision making and orchestration and fulfillment of these remediation actions. Another remediation example may regard a potential need to maintain a level of service based on, for example, a service level agreement (SLA), or a quality of service (QoS) within the cloud service that is realized based on the topology (302). In this example, the addition of resources to support the increase in demand for resources may be handled based on the potential scenarios described herein. More details regarding monitoring of the instantiated realized or inferred deployed topology and event handling therein will be described in more detail below.

As described herein, the nodes (302-1, 302-2, 302-3, 302-4, 302-5, 302-6, 302-7) may include a number of lifecycle management actions (LCMA) (304) associated with the nodes (302-1, 302-2, 302-3, 302-4, 302-5, 302-6, 302-7). The LCMAs (304) are a number of actions associated with the policies (303) that are executed by a processor when triggered by the policies (303) within a cloud service environment in which the topology (302) is implemented. The LCMAs may be associated with and operable against a number of individual nodes, a number of groups of nodes, a number of nodes of a class of nodes, a subset of the nodes within the entire topology of the cloud service; the entire topology of the cloud service as a whole, or combinations thereof. If the LCMAs are executed with respect to the individual nodes, groups of nodes, or the entire topology of the cloud services as a whole, the LCMAs will take an action with respect to the individual nodes, groups of nodes, the nodes of a class of nodes, a subset of the nodes within the entire topology of the cloud service, or the entire topology of the cloud service as a whole as defined within the LCMAs. LCMAs (304) include actions such as, for example, provisioning of computing resources (e.g., first day operations) within the topology, discovering and/or updating a realized or inferred topology (e.g., second day operations), copying all or portions of the topology, modifying computing resources within the topology, moving computing resources within the topology, destroying or deleting resources within the topology, among other lifecycle management actions.

The various policies (303) described herein define what actions are to be performed throughout the lifecycle of the topology (302) before, during, and after instantiation of a service based on the topology (302). Further, the various policies (303) described herein define how these actions are to be performed. Still further, the various policies (303) described herein define which device, individual, or combination thereof to which the actions are to be delegated. Even still further, the various policies (303) described herein define combinations. For example, any of the monitoring policies (303) used in event handling and processing, or remediation may define what devices or portions of the cloud service are to be monitored or remediated, how to execute such monitoring and remediation, to whom or what devices to delegate the roles of monitoring and remediation, or a combination thereof.

As a result of the systems and methods described herein, an instantiated service (312) is provided to the user for use. The instantiated service (312) comprises a number of computing devices that match the designed topology (302) and the nodes (302-1, 302-2, 302-3, 302-4, 302-5, 302-6, 302-7) within the topology (302). The instantiated service (312) functions based on the policies (303) described herein. The computing devices that make up the instantiated service (312) may comprise, for example, servers, switches, client devices, and databases, among many other computing devices. A realized and/or inferred topology (314) is derived by the LCM engine (311) or other device based on the instantiated service (312).

In addition to the instantiated service (312), a monitoring system (313) is also deployed if not already existent, or setup and configured if already available in order to monitor the instantiated service (312). With the inclusion of a monitoring system (313) within a provisioning (e.g., first day operations) or a different (e.g., second day operations) topology-based management broker (300), the topology-based management broker (300) provides for a converged management and security (CM&S) environment. In one example, the CM&S environment may be the CM&S environment developed and distributed by Hewlett Packard Corporation. In another example, the CM&S environment may be the CM&S environment described in International Patent App. Pub. No. PCT/US2012/059209, entitled "Hybrid Cloud Environment" to Maes et al., which is hereby incorporated by reference in its entirety. The CM&S environment provides for template-based and model-based approaches to application and service development and deployment, with the ability to bind management and security capabilities to service models at deployment time in order to ensure common capabilities across hybrid cloud environments. CM&S also provides portability across private and public cloud environments, which may include heterogeneous infrastructures, management, and security tools. Further, CM&S provides efficient delivery and management of the application release, whether the infrastructure resources are on premise, in the public cloud or in a hybrid environment across public and private clouds. CM&S also provides role-based, predictive, and real-time performance and risk insights, and analytics such as, Business Intelligence (BI), Business Activity Monitoring (BAM), and big data analyses across heterogeneous systems, networks, and cloud environments.

Moreover, CM&S may be used as a platform to support self-management services or autonomous management services. Accordingly, CM&S may support the programming model described herein.

In one example, the monitoring system (313) operates based on the monitoring policies (303) associated with the topology (302) and the nodes (302-1, 302-2, 302-3, 302-4, 302-5, 302-6, 302-7) of the topology (302) as described herein. In this example, the monitoring system (313) is used to monitor the operations, the security, the compliance, and the usage of the topology (302) and the nodes (302-1, 302-2, 302-3, 302-4, 302-5, 302-6, 302-7) of the topology (302), among other items to monitor within the instantiated service (312).

In one example, the monitoring system (313) is deployed to monitor the instantiated service (312) in cases where the monitoring system (313) already exists. In this example, a number of existing monitoring devices may be used to monitor the instantiated service (312) autonomously, through human intervention, or a combination thereof by configuring the existing monitoring system (313) to match the monitoring policies (303) defined when designing the topology (302). In this example, the monitoring system (313) already existent may be configured based on the monitoring policies (303) associated with an instantiated, realized, and/or inferred topology (302) and to instantiate and/or discovered nodes (302-1, 302-2, 302-3, 302-4, 302-5, 302-6, 302-7) of the topology (302) as described herein, configured based on input from a user, or combinations thereof.

Accordingly, a designed topology such as, for example, an architecture topology generated, for example, by an automated or manual matching process with policies and LCMAs associated with the nodes of the topology (302) is modified at the time of provisioning. This may be performed by executing, with the provisioning policy engine (502) or the resource offering manager (308), the provisioning policies to determine a topology that satisfies the provisioning policies perfectly or in the best obtainable manner. Obtaining a best fit topology may involve a number of resource provider policies (308-1) provided by the resource offering manager (308) which describe the capabilities and selection criteria of a resource provider. The resource offering manager (308) selects, for example, the resource provider from which the resource is to be obtained, and may also make other modifications to the topology (302).

The topology (302) is modified per the received provisioning policies (308-1) by the provisioning policy engine (502) as indicated by arrow 507, and sent to an interpreter (503). The interpreter (503) is any hardware device or a combination of hardware and software that interprets the provisioning policies to create an execution plan as indicted by arrow 508. The result is then interpreted and converted into an execution plan (508) that comprises a workflow or sequence of serial and/or parallel scripts in order to create an instance of the topology (FIG. 1A, 312). In one example, the interpreter (503) is a stand alone device or is contained within the LCM engine (FIG. 1A, 311). The execution plan (508) comprises a number of workflows or sequences of serial and/or parallel scripts. The topology LCM engine (311) obtains the workflows or sequences of serial and/or parallel scripts, calls a resource provider via the resource offering manager (308) as indicated by arrow 509, and creates an instantiated service (312) at block 505. Assuming the workflow or sequence of serial and/or parallel scripts is executable, which it should be in the case of an architecture descriptive topology, the actions associated with the workflow or sequence of serial and/or parallel scripts are executed by the LCM engine (311).

With the above-described sequence based topology, an execution plan (508) may be represented as a blueprint. Conversely, a blueprint may be expressed as an execution plan (508). A blueprint with nodes expanded by policies (303) and LCMAs (304) may be similarly processed, instead, in a manner similar to the processing of an infrastructure topology. In this example, the blueprint in the form of a sequential service design (506) is input to the interpreter for processing as described above in connection with FIG. 5.

The execution of the execution plan (508) by the topology life cycle management engine (311) results in an instantiation of the cloud services including the provisioning of devices for monitoring, event handling, and processing and remediation of events and incidents as will be described in more detail below. The result of the topology life cycle management engine (311) executing the workflow or sequence of serial and/or parallel scripts as defined by the execution plan (508) is an instantiated service (312) as indicated by block 505. Further, a realized topology (314) may be created based on the instantiated service (312), and stored as will also be described in more detail below.

As to the monitoring and remediation policies described herein, the same type of process may be applied, but with a number of realized policies defined within an instantiated service (312) and its realized topology (314) as input. In this process, additional LCMAs (304) may be created and used to assist in provisioning resources in an updated instantiated service (312). The explanation below across CSA/CDA use cases with architecture topologies or with blueprints shows the notion of common engine, pattern, and platform across all these cases.

The present systems and methods may be used in conjunction with any third party modeling such as, for example, HEAT command language interpreter that is an open source software developed and distributed by the OpenStack Foundation and released under the terms of the Apache License. Although HEAT may assist in the creation of a set of scripts fitting in the space of the execution plan, HEAT may provide support by interpreting or translating data, and converting the data into scripts. The present systems and methods may add the policies (303) and LCMAs (304) to the HEAT interpreter, and execute as described above.

Further, the present systems and methods may use topology and orchestration OASIS specification for cloud applications (TOSCA), a cloud computing standard to express topologies. In this example, the policies (303) and LCMAs (304) are added to a TOSCA-based topology.

Thus, the policies (303) and the LCMAs (304) may be implemented as function calls (305) or scripts in order to provision and deploy the topology (302) when the policies (303) and the LCMAs (304) trigger such provisioning and deployment. A resource offering manager (308) may be provided within the topology-based management broker (300) to manage and provide computing resources within the topology (302) based on the policies (302) and LCMAs (304).

The resource offering manager (308) provides a number of plug-ins to execute the life cycle manager (311). As described above, the resource offering manager (308) associates a number of resource policies (308-1) to the plug-ins of a number of resource providers so that the resource providers may assist in guiding the selection process of a number of the resource providers. The non-resource provider policies such as policies (103) associated to the nodes are different in that they are associated with the nodes (302-1, 302-2, 302-3, 302-4, 302-5, 302-6, 302-7) during the designing of a topology (302).

The resource offering manager (308) may be operated by, for example, an administrator, or a service provider in order to provision the resources within the cloud service to be created via the deployment of the topology (302). As discussed above, the resource offering manager (308) comprises the hardware and software to define a number of resource provider policies (308-1), associate a number of those resource provider policies (308-1) with a number of the nodes (302-1, 302-2, 302-3, 302-4, 302-5, 302-6, 302-7), the topology (302), or portions of the topology (302). When the topology (302) is deployed, the resource offering manager (308) provides the computing resources to the user that will implement the topology (302) based on the policies (303), the LCMAs (304), and the resource provider policies (308-1). As a result, the LCMAs are functions of the policies (303) associated with the topology (302), and the resource provider policies (308-1).

Thus, in one example, the resource offering manager (308) may implement a number of resource provider policies (308-1) that define under which conditions a computing resource from a number of service providers may be selected for deployment within the topology (302). In this example, the policies (303) associated with a node as well as the resource provider policies (308-1) define which resource offering from the resource offering manager (308) is selected for provisioning within the to-be-deployed instantiated topology (312). For example, if a policy associated with node (302-1) requires that the provisioned computing resource be located in a secure facility, and the policies of the resources offered by the resource offering manager (308) indicate that those available computing resources are not located in a secure facility, then that non-secure computing resource provided by that particular service provider will not be selected. In this manner, the policies associated with the nodes (302-1, 302-2, 302-3, 302-4, 302-5, 302-6, 302-7) and the policies associated with the resource offering manager (308) determine which computing resources may be provisioned and deployed within the topology (302).

The topology-based management broker (300) may store the topology (302) in a catalog (310). In one example, the topologies (302) designed and stored in the catalog (310) may be made available to any interested party via a self-service portal (309). In another example, an application program interface (API) may be provided instead of or in addition to the self-service portal (309). In this example, the API may be used by an application executing within the topology-based management broker (300) which may make a request from the catalog (310) for a number of topologies (302).

In another example, the user may be given the opportunity to view the catalog (310) of stored topologies to obtain a topology that was created for a first user or organization, and use a number of those topologies as the user's topology by ordering or subscribing to a topology (302). In still another example, the user may be given the opportunity to view the catalog (310) of stored topologies to obtain a topology that was created for a first user or organization, obtain a number of those topologies, and add a number of other topologies to it such as in an example where an application model is built on an infrastructure template using stitching processes described below.

In still another example, the user may be given the opportunity to view the catalog (310) of stored topologies to obtain topologies that were created for a first user or organization, obtain a number of those topologies, and add a number of other topologies to it such as topologies designed de novo or stored within the catalog (310). In still another example, the user may be given the opportunity to view the catalog (310) of stored topologies to obtain topologies that were created for a first user or organization, obtain a number of those topologies, and build a new cloud service that comprises aspects of all the predefined topologies and the respective services described by the pre-defined topologies.

In another example, the user, a service designer, or a combination thereof may design the topology anew, design a topology based on a topology stored in the catalog (310), or design a topology based partially on a topology stored in the catalog (310). Design of a topology (302) may be split among a number of users, designers, and administrators. The designing of the topology (302) may include separating the design of the topology into a number of topologies and attaching to the separate pieces of the individual topologies and the topology as a whole a number of properties, LCMAs, and policies. The user may also order a desired topology, be given an opportunity to approve of the chosen topology, and view and operate the topology by executing a number of applications on the resultant cloud service.

In another example, an application program interface (API) may be made available that invokes the call functions associated with the desired topology (302). In the self-service portal (309) example, the catalog (310) may be made available to the user, may identify to the user the item or items associated with the desired topology (302), may provide the ability for the user to order a number of services, and provide for the deployment of the selected topology (302). In one example, the deployment of the topology (302) may be approved by the user or a manager as defined by an approval workflow before deployment based on, for example, a service level agreement (SLA), cost of the cloud services, and the policies, among other considerations. In still another example, once the topologies (302) are designed and stored in the catalog (310), the topologies (302) may be identified by commercial terms and associated descriptions of how the topology (302) may be used.

When a topology (302) has been designed, the topology (302) may be provisioned on behalf of the user to create a subscription within the SLA. The topology lifecycle management (LCM) engine (311) is a data processing device that will execute the topology (302) to provision and deploy computing resources to form the cloud service for use by the user. The topology LCM engine (311) analyzes the topology (302) created, and creates a set of scripts that form execution logic in the form of the execution plan to instantiate and realize the topology (302). In one example, the set of scripts define a sequence of provisioning and deployment of computing resources. The topology LCM engine (311) applies the policies associated with the topology (302) and the nodes (302-1, 302-2, 302-3, 302-4, 302-5, 302-6, 302-7) of the topology (302) as well as the policies set for the resources managed by the resource offering manager (308).

As a result of the above systems and methods, an instantiated service (312) is provided to the user for use. The instantiated service (312) comprises a number of computing devices that match the designed topology (302) and the nodes (302-1, 302-2, 302-3, 302-4, 302-5, 302-6, 302-7) within the topology (302). The instantiated service (312) functions based on the policies described above. The computing devices that make up the instantiated service (312) may comprise, for example, servers, switches, client devices, and databases, among many other computing devices. A realized topology (314) is derived by the LCM engine (311) or other device based on the instantiated service (312).

In addition to the instantiated service (312), a monitoring system (313) is also deployed if not already existent, or setup and configured if already available in order to monitor the instantiated service (312). With the inclusion of a monitoring system (313) within the topology-based management broker (300), the topology-based management broker (300) provides for a converged management and security (CM&S) environment. In one example, the CM&S environment may be the CM&S environment developed and distributed by Hewlett Packard Corporation. In another example, the CM&S environment may be the CM&S environment described in International Patent App. Pub. No. PCT/US2012/059209, entitled "Hybrid Cloud Environment" to Macs et al., which is hereby incorporated by reference in its entirety. The CM&S environment provides for template- and model-based approaches to application and service development and deployment, with the ability to bind management and security capabilities to service models at deployment time in order to ensure common capabilities across hybrid cloud environments. CM&S also provides portability across private and public cloud environments, which may include heterogeneous infrastructures, management, and security tools. Further, CM&S provides efficient delivery and management of the application release, whether the infrastructure resources are on premise, in the public cloud or in a hybrid environment across public and private clouds. CM&S also provides role-based, predictive, and real-time performance and risk insights, and analytics such as, Business Intelligence (BI), Business Activity Monitoring (BAM), and big data analyses across heterogeneous systems, networks, and cloud environments.

In one example, the monitoring system (313) operates based on the monitoring policies associated with the topology (302) and the nodes (302-1, 302-2, 302-3, 302-4, 302-5, 302-6, 302-7) of the topology (302) as described above. In this example, the monitoring system (313) is used to monitor the operations, the security, the compliance, and the usage of the topology (302) and the nodes (302-1, 302-2, 302-3, 302-4, 302-5, 302-6, 302-7) of the topology (302), among other items to monitor within the instantiated service (312).

In one example, the monitoring system (313) is deployed to monitor the instantiated service (312) in cases where the monitoring system (313) already exists. In this example, a number of existing monitoring devices may be used to monitor the instantiated service (312) autonomously, through human intervention, or a combination thereof by configuring the existing monitoring system (313) to match the monitoring policies defined when designing the topology (302). In this example, the monitoring system (313) already existent may be configured based on the monitoring policies associated with the topology (302) and the nodes (302-1, 302-2, 302-3, 302-4, 302-5, 302-6, 302-7) of the topology (302) as described above, configured based on input from a user, or combinations thereof.

In another example, a previously non-existent monitoring system (313) may be provisioned and deployed based on the monitoring policies (303) defining and/or discovering the topology (302). In this example, the monitoring system (313) is provisioned and deployed at the same time as the provisioning and deployment of the instantiated service (312). Further, the monitoring system (313), in this example, is deployed and managed based on the monitoring policies associated with the topology (302) and the nodes (302-1, 302-2, 302-3, 302-4, 302-5, 302-6, 302-7) of the topology (302) as described herein. In any of the examples herein, a complete service as outlined by the topology (302) is created, including an instantiated system (312) and the monitoring system (313).

The topology-based management broker (300) further may include a realized topology system management (RTSM) database (315). The RTSM database (315) is a logical system repository of realized topologies (314) and/or inferred realized topologies, and may be any form of data repository. In one example, the RTSM database (315) comprises a database management system (DBMS). The DBMS is a combination of hardware devices and software modules that interact with a user, other applications, and the database itself to capture and analyze data. In one example, the RTSM database (315) is a configuration management database (CMDB). A CMDB is a repository of information related to all the components of a realize topology (314).

The DBMS of the RTSM database (315) is designed to allow the definition, creation, querying, update, and administration of a database of realized topologies (314). Realized topologies are a model of the topologies (302) with the policies described herein associated therewith. Thus, the realized topology (314) comprises a model of the topology (302), with the policies (303) applied to the various nodes (302-1, 302-2, 302-3, 302-4, 302-5, 302-6, 302-7). A number of properties of the nodes (302-1, 302-2, 302-3, 302-4, 302-5, 302-6, 302-7) of the realized topology (314) are defined within the realized topology (314). These properties include any details of any instantiated service (312) that is created or updated via the topology-based management broker (300), and may include, for example, the internet protocol (IP) address of the nodes, and characteristics and computing parameters of the nodes, among many other properties.

The topology (302) can be a realized topology and/or an inferred realized topology. As described herein a realized topology can be a topology (302) that is developed and mapped by an organization that is also utilizing the realized topology. An inferred realized topology can be a topology (302) that is a discovered topology. The inferred realized topology can be discovered utilizing a number of methods. Discovering the inferred realized topology can include mapping a number of service instances into the inferred realized topology. In some embodiments, discovering the inferred realized topology can include examining a number of relationships in a universal CMDB (e.g., uCMDB) or similar system. In some embodiments, examining the number of relationships includes discovering information about deployed systems of the cloud system and examining the relationships between the discovered information about the deployed systems.

Discovering the inferred realized topology can include utilizing enterprise map data to aid in examining the relationships between the discovered information about the deployed systems. In addition, discovering the inferred realized topology can include performing a number of manual edits, manual guidance, and/or manual design of the inferred realized topology. In some embodiments, the inferred realized topology can be discovered by manual entry and/or manual design of the inferred realized topology by creating a number of inferred realized instances. The inferred realized topology can be utilized in the same and/or similar manner as the topology (302) and realized topology as described herein.

In some embodiments, the topology (302), realized topology, and/or inferred realized topology can be applied to cloud services that are provisioned by other systems and/or other entities or managed by other systems and/or entities. For example, the cloud services can be provisioned or managed by a service such as: PaaS systems such as cloudfoundry, heroky, openshift, AWS beanstalk, Azure, auto-remediated by an entity unknown to the management broker (300).

Discovering inferred realized topologies and/or realized topologies can enable the management broker (300) to have applications that are built/developed on the management broker (300) for second day operation without first day operation. As described herein, second day operation without first day operation can include provisioning and/or managing a cloud service that was not developed by the same entity, as described herein. In addition, the realized and inferred realized topologies can be utilized by the management broker (300) to manage and/or provision services that were not previously managed and/or provisioned by the management broker (300).

The RTSM (315) is a repository that stores each instance of a realized topology (314). In this manner, every time a topology (302) is designed, provisioned, and deployed, the topology-based management broker (300) captures the realized topology (314) of that topology (302). Thus, the RTSM (315) contains a realized topology (314) of every topology (302) that has been instantiated within the topology-based management broker (300) or, through the below-described remediation processes, stores a modification of a realized topology or an instantiated service (312). Thus, in one example, in every instance of the modification of an existing topology (302), the realized topology (314) resulting from that modification is also stored within the RTSM (315). The remediation processes will now be described in more detail.

As may happen within the topology-based management broker (300), a number of events may occur within the topology-based management broker (300). These events may include, for example, a policy failure within a node of the instantiated service (312), a failure of one or more hardware or software components within the instantiated service (312), and an unauthorized access of the instantiated service (312), among many other computing-related events. Further, the monitoring system (313) monitors a number of performance-related and utilization-related events that may occur within the instantiated service (312). These performance-related events and utilization-related events may include, for example, processor utilization within a number of the nodes, utilization of a number of the nodes by, for example, customers of the user's business, and levels of remaining data storage space within a data storage device, among many other performance-related events and utilization-related events.

In one example, the monitoring system (313) informs the event handler (316) of any events detected by the monitoring system (313). The event handler (316) is any computing device that receives data associated with detected events from the monitoring system (313), and processes the data in order to create a number of incidents that may arise from the detected events.

Thus, the topology-based management broker (300) processes the events that are detected by the monitoring system (313). Processing of events detected by the monitoring system (313) may be performed by the event handler (316). The event handler (316) may receive any kind or amount of data from the monitoring system (313). As described above, the data received from the monitoring system (313) by the event handler (316) may include any data associated with the operation and usage of the instantiated service (312) as a whole, and the nodes (302-1, 302-2, 302-3, 302-4, 302-5, 302-6, 302-7) within the instantiated service (312) as groups of nodes and as individual nodes. In one example, the event handler (316) performs a number of requests for the event data. In this example, the event handler (316) may poll the monitoring system (313) for the event data after a predefined time period, randomly, when triggered by another event, or a combination thereof. As described above, event handling and processing may, in one example, be delegated to another system or third party service. For example, event handling such as correlation and filtering of events and incidents and incident identification may be delegated to HP BUSINESS SERVICE MANAGEMENT; a suite of service management software tools developed and distributed by the Hewlett Packard Corporation. Remediation processes may be delegated to HP OPERATIONS MANAGER I (HP OMi) or SITESCOPE; both comprising a suite of software tools developed and distributed by the Hewlett Packard Corporation. Security event notification, processing, and remediation may be delegated to HP ARCSIGHT; a suite of service management software tools developed and distributed by the Hewlett Packard Corporation. In one example, HP ARCSIGHT may reference the service agreement (SA) associated with the instantiated service (312) to comply with the SA.

The data received from the monitoring system (313) is processed by the event handler (316), and the event handler (316) determines whether an event requires a remediation action, and whether and how to present a notification of the event to a user, administrator, third party, or other user of the topology-based management broker (300) or instantiated service (312). If the event handler (316) determines that a remediation action is to be taken in connection with an event, the event handler (316) generates an incident based on the event, and the data associated with the event is sent to a remediation engine (317). In one example, the event handler (316) may process the events received from the monitoring system (313) using a number of processing types. Types of processing that the event handler (316) may perform include filtering, correlation, and aggregation of the events, among other forms of event processing, and combinations thereof. In one example, a number of events may collectively be subjected to a number of forms of event processing in order to create an incident. In this example, the events may individually not support the creation of an incident that requires remediation, but a number of events, when analyzed by the event handler (316), may indicate that an issue within the instantiated topology (312) is not in agreement with the policies (303), or is otherwise in need of remediation.

In another example, incidents may be identified from a number of ticket support systems. For example, an information technology (IT) service management system (ITSM) (316-1) may also be a source of incidents. An ITSM system (316-1) implements and manages the quality of IT services that meet the needs of the user. In one example, the ITSM system (316-1) is managed by the user, a service provider, a third party, or combinations thereof, in which a service ticket is opened by one of these groups or individuals. In another example, the ITSM system (316-1) may automatically enter a service ticket based on the events detected by the monitoring system. If the ITSM system (316-1) determines that the instantiated system (312) or a number of nodes (302-1, 302-2, 302-3, 302-4, 302-5, 302-6, 302-7) thereof are not appropriately provisioned, are wrongly provisioned, or are otherwise unfit for the instantiated system (312), the ITSM system (316-1) may, like the event handler (316), provide a remediation determination in the form of an incident sent to the remediation engine (317).

The incidents generated by the event handler (316) and the ITSM system (316-1) may be brought to the attention of a user, administrator, third party, or other user of the topology-based management broker (300) or instantiated service (312) in the form of a notification. As described above, the remediation policies define how a remediation action is to be performed, and may include: (1) providing notifications to a user, consumer, or administrator; (2) obtaining instructions from the user, consumer, or administrator; (3) taking manual actions input by the user, consumer, or administrator; (4) taking autonomous actions after receiving instructions from the user, consumer, or administrator; (5) taking autonomous actions without receiving instructions from the user, consumer, or administrator; (6) taking autonomous actions without notifying the user, consumer, or administrator or receiving instructions from the user, consumer, or administrator; or combinations thereof. In this manner, the issuance of notifications within the system is defined by the remediation policies.

The remediation engine (317) executes, via a processor, logic to correct the incidents reported by the event handler (316) and/or ITSM system (316-1). Remedies issued by the remediation engine (317) may include, for example, allocation of additional computing resources, allocation of different computing resources, and reallocation of computing resources from one geographical area to another, among many other remediation actions. In one example, the remediation actions taken by the remediation engine (317) are implemented to remedy a misallocation of computing resources that does not comply with the policies associated with the topology (302) designed. In another example, the remediation actions taken by the remediation engine (317) are implemented to remedy a failure of a number of computing resources within the instantiated service (312). In still another example, the remediation actions taken by the remediation engine (317) are implemented to adjust the security levels of the instantiated service (312) and the groups and individual computing resources therein. Any number of other remediation actions may be implemented by the remediation engine (317) for any number of reasons.

In one example, the remediation actions taken by the remediation engine (317) are implemented with or without notification to a user, administrator, third party, or other user as described above. Further, in another example, the remediation actions taken by the remediation engine (317) are implemented autonomously, without user interaction or confirmation from a user.

In still another example, the remediation actions taken by the remediation engine (317) are implemented with user interaction from the consumer, administrator, third party, or other user. In this example, the remediation engine (317) sends data to a self-service subscription management engine (318). The self-service subscription management engine (318) executes, via a processor, logic to present information to a user regarding the events detected by the monitoring system (313) and the incidents generated by the event handler (316) and ITSM system (316-1). The self-service subscription management engine (318) also executes, via a processor, logic to present to a user a number of recommendations for remediation of the events and incidents.

In one example, the self-service subscription management engine (318) executes, via a processor, logic to present a number of graphical user interfaces (GUIs) (318-1) to a user. In this example, the GUIs (318-1) allow a user to view the realized topology (314), and the events detected by the monitoring system (313) and the incidents generated by the event handler (316) and ITSM system (316-1). In this manner, the user is able to identify the problems within the realized topology (314) via the GUIs (318-1) produced by the self-service subscription management engine (318). Further, the GUIs (318-1) allow the user to select a recommended remediation action and define how the remediation action may be executed.

In another example, the self-service subscription management engine (318) may execute, via a processor, an API to provide to a user a number of indicators within a representation of the realized topology (314) that represent the problem within the realized topology (314) paired with information regarding the problem and which nodes (302-1, 302-2, 302-3, 302-4, 302-5, 302-6, 302-7) in the realized topology (314) the problem is associated with.

When the remediation engine (317) executes its logic to correct the incidents reported by the event handler (316) and ITSM system (316-1), and/or when a user, via the self-service subscription management engine (318), selects a remediation action to be taken, the topology-based management broker (300) executes a number of calls to a number of lifecycle management actions (LCMAs) to remediate the incidents. LCMAs may include, for example, duplication, moving, copying, or killing of a number of computing resources including all or portions of the realized topology (314), among other LCMAs.

The topology LCM engine (311) executes a new topology (302) created through the remediation processes to provision and deploy computing resources to form a new instantiated service (312). Thus, the topology LCM engine (311) iteratively applies the LCMAs received from the self-service subscription management engine (318) and the remediation engine (317) to the realized topology (314) to create the new and subsequent instantiated service (312).

The remediation processes comprises all of the functionality of the monitoring system (313), the event handler (316), the ITSM system (316-1), the remediation engine (317), the self-service subscription management engine (318), the topology LCM engine (311), and combinations thereof. Any number of iterations of this remediation process may be applied to successive realized topologies (314) to create successively new instantiated services (312). In this manner, the new instantiated service (312) will comprise a number of computing resources that match the designed topology (302) as well as the changes made by the executed LCMAs via the remediation process. Thus, the topology-based management broker (300), with the topology LCM engine (311), derives a new and subsequent realized topology from the new and subsequent instantiated service (312), and stores the subsequent realized topology in the RTSM (315).

Based on the above, the topology-based management broker (300) is able to provision, deploy, and maintain an instantiated service (312) autonomously with or without user interaction. Thus, in this manner, a number of applications being executed on the instantiated service (312) are able to be self-executing on the instantiated service (312) by, for example, calling an API.

As described above, the structures of blueprints (100) are difficult to use as models of applications or templates of infrastructures as CONTINUOUS DELIVERY AUTOMATION (CDA) does. CDA is system tool utilized within a topology designer that independently models infrastructure and application requirements while managing versions, configurations, and other application components. CDA is also developed and distributed by Hewlett Packard Corporation. The structures of blueprints (100), for the same reason given above, are difficult to use as models of applications because blueprints do not describe the architecture of the application. Further, blueprints are difficult to use as templates of an infrastructure because they also do not describe the architecture of the infrastructure. As a result, systems aiming at modeling application models and infrastructure or platform templates, and mapping the application models and infrastructure or platform templates to each other are not easily reconciled with the blueprints because they are based on different methods of modeling these services. The reconciliation between the models of a number of applications executed on the deployed service with the infrastructure templates of the service will now be described.

As depicted in FIG. 4, the topology-based management broker (300) further comprises a subsystem capable of independently modeling infrastructure and application requirements of a topology on the same stack as the subsystem depicted in FIG. 3A. However, as described above, the present systems and associated methods also support all the use cases that a CDA supports such as those CDA supports. As described above, CDA is a number of software tools utilized within a topology designer that independently model infrastructure and application requirements while managing versions, configurations, and other application components. CDA is also developed and distributed by Hewlett Packard Corporation.

The subsystem of the topology-based management broker (300) depicted in FIG. 4 may be used to design a topology for a number of applications to be executed on the instantiated service (312). The subsystem of FIG. 4 assists in the provisioning, deploying, and maintaining of a topology that supports the applications, and provides application models that match appropriate infrastructure templates. In one example, the models of the applications executed on the deployed topology utilize designed topologies that are easily reconciled with the templates defining the infrastructure topologies of the topology.

A topology designer (301) may be used to design and create an application model (319). The application model (319) is defined by a lifecycle management topology. As described above in connection with the LCM topology (302), the application model (319) comprises a number of nodes (319-1, 319-2, 319-3). A number of policies and lifecycle management actions (LCMA) are associated with each of the nodes (319-1, 319-2, 319-3) of the application model (319).

A topology designer (301) may also be used to create a number of infrastructure and/or platform templates (320). The templates (320) are defined by a lifecycle management topology. As described above in connection with the LCM topology (302), the templates (320) comprise a number of nodes (320-1, 320-2, 320-3, 320-4, 320-5). A number of policies and lifecycle management actions (LCMA) are also associated with each of the nodes (320-1, 320-2, 320-3, 320-4, 320-5) of the templates (320).

In one example, the topology designers (301), self-service portal (309), and resource offering manager (308), alone or in combination, may associate a number of policies (303) and LCMAs (304) with the nodes (319-1, 319-2, 319-3, 320-1, 320-2, 320-3, 320-4, 320-5) of the application model (319) and infrastructure template (320). In another example, a separate policy engine and LCMA engine may be provided to associate the nodes (319-1, 319-2, 319-3, 320-1, 320-2, 320-3, 320-4, 320-5) of the application model (319) and infrastructure template (320) with the policies and LCMAs as described above.

As depicted in FIG. 4, a number of models (319) may be presented as possible matches or near matches for a number of infrastructure templates (320). In one example, rather than using a topology designer (301), a number of application models (319) resources may be provided within the topology-based management broker (300). In this example, the topology-based management broker (300) may obtain application models (319) from, for example, the catalog (310), the RTSM (315), another model source, or combinations thereof. A user may browse through these model sources and obtain a number of application models (319) that may be reconciled with the infrastructure templates (320). In this manner, the topology designer (301) may design a number of application models (319) or a number of application models (319) may be obtained from the above-described resource. Thus, the application models (319) may be application topologies designed by the topology designer (301), or realized application topologies as described above.

Similarly, as depicted in FIG. 4, a number of templates (320) are presented as possible matches or near matches for the application model (319). In one example, rather than using a topology designer (301), a number of template (320) resources may be provided within the topology-based management broker (300). In this example, the topology-based management broker (300) may obtain templates (320) from, for example, the catalog (310), the RTSM (315), another template source, or combinations thereof. A user may browse through these template sources and obtain a number of templates (320) that may be reconciled with the application model (319). In this manner, the topology designer (301) may design a number of templates (320) or a number of templates may be obtained from the above-described resource. Thus, the templates (320) may be infrastructure topologies designed by the topology designer (301), or realized infrastructure topologies as described above.

The topology-based management broker (300) further comprises a realized topology system management (RTSM) database (315). The RTSM database (315) is a logical system repository of realized topologies (314), and may be any form of data repository. In one example, the RTSM database (315) comprises a database management system (DBMS). The DBMS is a combination of hardware devices and software modules that interact with a user, other applications, and the database itself to capture and analyze data. In one example, the RTSM database (315) is a configuration management database (CMDB). A CMDB is a repository of information related to all the components of a realized topology (314).

The DBMS of the RTSM database (315) is designed to allow the definition, creation, querying, update, and administration of a database of realized topologies (314). Realized topologies are a model of the topologies (302) with the policies described above associated therewith. Thus, the realized topology (314) comprises a model of the topology (302), with the policies applied to the various nodes (302-1, 302-2, 302-3, 302-4, 302-5, 302-6, 302-7). A number of properties of the nodes (302-1, 302-2, 302-3, 302-4, 302-5, 302-6, 302-7) of the realized topology (314) are defined within the realized topology (314). These properties include any details of any instantiated service (312) that is created or updated via the topology-based management broker (300), and may include, for example, the internet protocol (IP) address of the nodes, and characteristics and computing parameters of the nodes, among many other properties.

The RTSM (315) is a repository that stores each instance of a realized topology (314). In this manner, every time a topology (302) is designed, provisioned, and deployed, the topology-based management broker (300) captures the realized topology (314) of that topology (302). Thus, the RTSM (315) contains a realized topology (314) of every topology (302) that has been instantiated within the topology-based management broker (300) or, through the below-described remediation processes, stores a modification of a realized topology or an instantiated service (312). Thus, in one example, in every instance of the modification of an existing topology (302), the realized topology (314) resulting from that modification is also stored within the RTSM (315). The topology-based management broker (300) further comprises a realized topology system management (RTSM) database (315). The RTSM database (315) is a logical system repository of realized topologies (314), and may be any form of data repository. In one example, the RTSM database (315) comprises a database management system (DBMS). The DBMS is a combination of hardware devices and software modules that interact with a user, other applications, and the database itself to capture and analyze data. In one example, the RTSM database (315) is a configuration management database (CMDB). A CMDB is a repository of information related to all the components of a realize topology (314).

The DBMS of the RTSM database (315) is designed to allow the definition, creation, querying, update, and administration of a database of realized topologies (314). Realized topologies are a model of the topologies (302) with the policies described above associated therewith. Thus, the realized topology (314) comprises a model of the topology (302), with the policies applied to the various nodes (302-1, 302-2, 302-3, 302-4, 302-5, 302-6, 302-7). A number of properties of the nodes (302-1, 302-2, 302-3, 302-4, 302-5, 302-6, 302-7) of the realized topology (314) are defined within the realized topology (314). These properties include any details of any instantiated service (312) that is created or updated via the topology-based management broker (300), and may include, for example, the internet protocol (IP) address of the nodes, and characteristics and computing parameters of the nodes, among many other properties.

The RTSM (315) is a repository that stores each instance of a realized topology (314) either designed and/or inferred. In this manner, every time a topology (302) is designed, provisioned, inferred, and deployed, the topology-based management broker (300) captures the realized topology (314) of that topology (302). Thus, the RTSM (315) contains a realized topology (314) of every topology (302) that has been instantiated within the topology-based management broker (300) or, through the below-described remediation processes, stores a modification of a realized topology or an instantiated service (312). Thus, in one example, in every instance of the modification of an existing topology (302), the realized topology (314) resulting from that modification is also stored within the RTSM (315).

A number of resource provider policies (308-1) may be associated (block 704) with a number of nodes (302-1, 302-2, 302-3, 302-4, 302-5, 302-6, 302-7) within the topology (302). Resource provider policies (308-1) are any policies associated with a number of resource providers' offerings that guide the selection of a number of resources. In one example, the resource provider policies (308-1) may be dynamic functions that define the computing abilities of a computing resource. In this example, a computing resource that provides a defined level of computing resources such as, for example, processing power, may be provisioned by the LCM engine (311) and resource offering manager (308) if the defined level of that computing resource meets a number of requirements within the topology (302).

Figure 6:
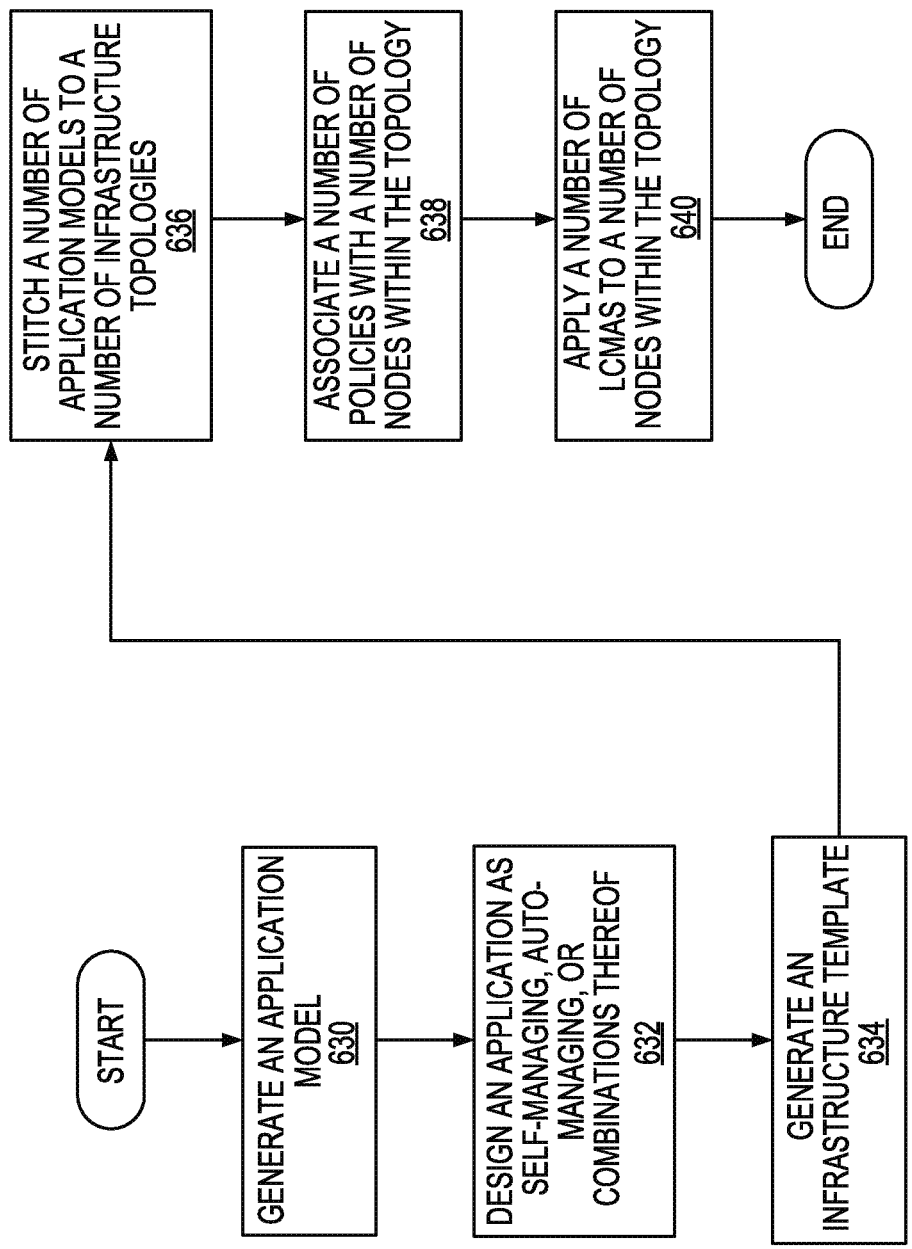
FIG. 6 is a flowchart showing a method of designing a topology, according to the present disclosure.

FIG. 6 is a flowchart showing a method of designing a topology, according to one example of the principles described herein. The method of FIG. 6 may begin by generating (block 630) an application model (FIG. 4, 319). In one example, a topology designer (301) may be used to design and create the application model (FIG. 4, 319), and, in this manner, generate an application model (FIG. 4, 319). In another example, the application model (FIG. 4, 319) may be obtained from a number of application model (FIG. 4, 319) sources such as, for example, the catalog (FIG. 3, 310), the RTSM (FIG. 3, 315), or the DSL database (FIG. 4, 323), among other application model (FIG. 4, 319) sources. The application model (FIG. 4, 319) is defined by a lifecycle management topology. As described herein in connection with the LCM topology (FIG. 3, 302), the application model (FIG. 4, 319) comprises a number of nodes (FIG. 4, 319-1, 319-2, 319-3).

Generating (block 630) an application model may include designing (block 532) an application as self-managing, auto-managing, or combinations thereof. A number of infrastructure templates (FIG. 4, 320) may also be generated (block 534). In one example, a topology designer (301) may be used to design and create the infrastructure template (FIG. 4, 320). In another example, the infrastructure template (FIG. 4, 320) may be obtained from a number of infrastructure template (FIG. 4, 320) sources such as, for example, the catalog (FIG. 3, 310), the RTSM (FIG. 3, 315), or the DSL database (FIG. 4, 323), among other infrastructure template (FIG. 4, 320) sources. The infrastructure template (FIG. 4, 320) is defined by a lifecycle management topology. As described herein in connection with the LCM topology (FIG. 3, 302), the infrastructure template (FIG. 4, 320) comprises a number of nodes (FIG. 4, 319-1, 319-2, 319-3). In one example, a number of persons may use the topology designers (301) to design the application models (FIG. 4, 319) and infrastructure templates (FIG. 4, 320). These individuals may be service designers, infrastructure architects or administrators, system administrators, information technology operators, offer managers, or users, among other personnel with roles in the design of a topology.

A number of application models (FIG. 4, 319) are stitched (block 903) to a number of infrastructure templates (FIG. 4, 320). In one example, the stitching engine (FIG. 4, 321) may obtain a number of infrastructure topologies (FIG. 4, 320) stored in, for example, the DSL database (FIG. 4, 323) or other source of infrastructure templates (320), and stitch a number of application models (FIG. 4, 319) to a number of appropriate infrastructure templates (FIG. 4, 320). In another example, the infrastructure templates (FIG. 4, 320) may be designed de novo by a number of topology designers (301).

The stitching engine (FIG. 4, 321) may use any type of method to stitch the application models (FIG. 4, 319) to the infrastructure templates (FIG. 4, 320) based on the policies and LCMA associated with the application models (FIG. 4, 319) to the infrastructure templates (FIG. 4, 320). In one example, the stitching engine (FIG. 4, 321) may use a matching process in which the stitching engine (FIG. 4, 321) matches the policies, requirements, and capabilities associated with the nodes (FIG. 4, 319-1, 319-2, 319-3) of the application models (FIG. 4, 319) with the policies, requirements, and capabilities of the nodes (FIG. 4, 320-1, 320-2, 320-3, 320-4, 320-5) of the infrastructure templates (FIG. 4, 320). In this example, the stitching engine (FIG. 4, 321) may browse through the template sources described herein to find a match or near match. Once a match is found, the stitching engine (FIG. 4, 321) matches a number of nodes (FIG. 4, 319-1, 319-2, 319-3) of the application models (319) with a number of the nodes (FIG. 4, 320-1, 320-2, 320-3, 320-4, 320-5) of the matching infrastructure templates (FIG. 4, 320).

Another method the stitching engine (FIG. 4, 321) may use to stitch the application models (FIG. 4, 319) to the infrastructure templates (FIG. 4, 320) may comprise an algorithmic matching method. In this method, the stitching engine (FIG. 4, 321) determines mathematically via algorithms that employ the policies in performing the matching decisions. In one example, this may include inference methods in which requirements in the application level are tagged or otherwise associated with components that support them in the DSL database (FIG. 4, 323), wherein the overall infrastructure topology (FIG. 4, 320) is aggregated first before the aggregation is extended to the application models (FIG. 4, 319).

A number of policies and lifecycle management actions (LCMAs) are associated with each of the nodes (FIG. 4, 319-1, 319-2, 319-3) of the application model (FIG. 4, 319) and nodes of the infrastructure topology (FIG. 4, 320). In one example, the association of the number of policies (303) and LCMAs (304) with the nodes (319-1, 319-2, 319-3, 320-1, 320-2, 320-3, 320-4, 320-5) of the application model (319) and infrastructure topology (320) may be performed by the topology designers (301), self-service portal (309), and resource offering manager (308), alone or in combination. In another example, a separate policy engine and LCMA engine may be provided to associate the nodes (319-1, 319-2, 319-3, 320-1, 320-2, 320-3, 320-4, 320-5) of the application model (319) and infrastructure topology (320) with the policies (303) and LCMAs (304) as described herein.

In one example, the processes of associating policies (303) and lifecycle management actions (LCMAs) (304) with each of the nodes (FIG. 4, 319-1, 319-2, 319-3) of the application model (319) and nodes of the infrastructure topology (FIG. 4, 320) may be performed before, during, or after the stitching process described in connection with block 636. In one example where policies and LCMAs are associated before the stitching process of block 634, the policies (303) and LCMAs (304) may be associated with a number of nodes or groups of nodes within the application model (319) and infrastructure topology (320), as well as with the application model (319) as a whole and infrastructure topology (320) as a whole. In this example, additional policies (303) and LCMAs (304) may be associated with the topology (302) created via the stitching process. In another example, the processes of associating policies (303) and lifecycle management actions (LCMAs) (304) with each of the nodes (FIG. 4, 319-1, 319-2, 319-3) of the application model (319) and nodes of the infrastructure topology (FIG. 4, 320) may be optional as to performance of these processes after the stitching process of block 634. In still another example, the processes of associating policies (303) and lifecycle management actions (LCMAs) (304) with each of the nodes (FIG. 4, 319-1, 319-2, 319-3) of the application model (319) and nodes of the infrastructure topology (FIG. 4, 320) may be performed before and after stitching process of block 534.

The processes described in FIG. 6 results in a completely designed topology (302) similar to the topology (302) described herein in connection with FIG. 3. For example, the topology (FIG. 4, 302) resulting from the method of FIG. 6 may be used as the input topology (FIG. 3, 302). Further, in another example, the topology (FIG. 4, 302) resulting from the method of FIG. 6 may be used as the input topology (FIG. 3, 302) for instantiation in the remediation. Further still, in one example, a number of persons participate in the method described in FIG. 6. These individuals may be service designers, infrastructure architects or administrators, system administrators, information technology operators, offer managers, or users, among other personnel with roles in the design, execution, monitoring, and remediation of a topology (302).

Figure 7:
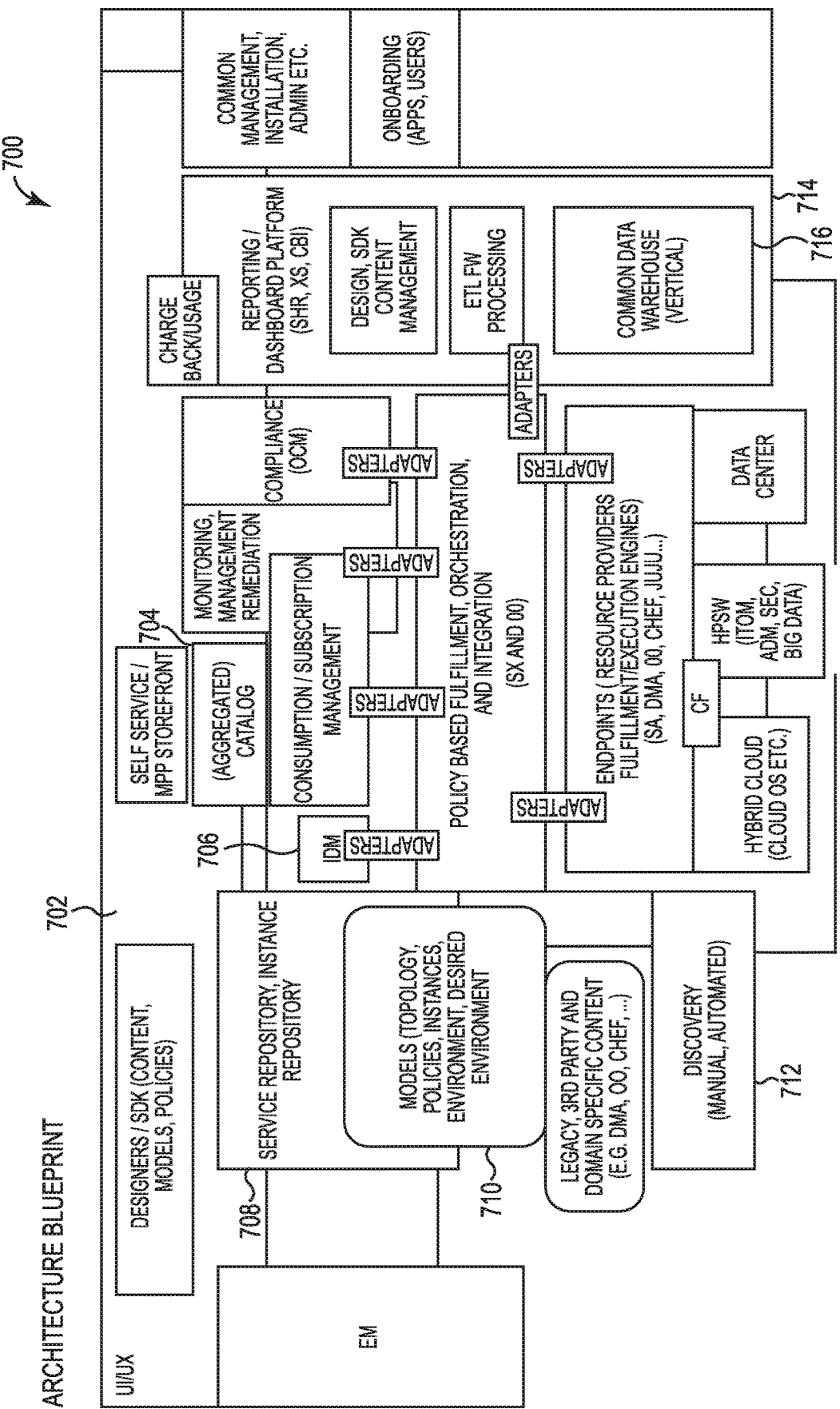
FIG. 7 is an example of a system, according to the present disclosure.

FIG. 7 is an example of a system (700), according to the present disclosure. FIG. 7 includes second day operations without first day operations. For example, FIG. 7 includes decoupling the realized topology from the way that the topology was previously provisioned and/or modified. The system (700) is a system where realized topologies can not only be known because they have been provisioned and managed by the system (600) but they can also be a discovered realized topology and/or an inferred realized topology, as described herein. The system (700) can include various elements to provision and manage a cloud system.

Discovered topologies refer to an ability to obtain information relating to the topology from a different system other than system (700) (i.e., topologies that have not been provisioned or that may have been managed and modified separately from the main system (700)).

For example, the topology can be from another cloud controller or system that provisioned the topology (e.g. a VMWare controller like vCenter, a legacy provisioner like SA, a system disconnected from the system (700), etc.). In another example, the topology can be inferred from repositories where the information has been stored by whoever or whatever system designed and/or defined the topology (e.g. HP Enterprise Map—EM), provisioned (e.g., HP UCMDB) and/or managed/modified the topology or modified the instance provisioned from the system.

For example, the inferred topology can be designs and/or specs from SA (Server Automation) or information stored in a CMDB. In inferred cases, the information from the repository can be loaded into the system (700) and mapped to a topology with policies (e.g., with the life cycle management action associated to the different elements and associated policies (e.g., inferred also or resulting from the policies associated in a certain context/data for the node type)). The inferred topology and/or the associated policies may be a best guess in some embodiments. The inferred topology can expose what is known (e.g., what can be used by the system (700) in terms of policies or LCM to further manage). Missing topology information and/or corrections to the inferred topologies (e.g. LCM details, dependencies/relationships, policies can then be updated manually using a console similar to a topology designer).

The system (700) can be important when the realized topologies are not the result of provisioning, management (e.g., management other than remediation) or remediation done by the system (700), but also when other systems act on the management of the realized topologies. For example, additional systems can be independent monitoring, managing, or remediating the realized topologies (e.g., system 700 is HP CSA based). In some embodiments, the CSA policies can include sharing the realize topology instances in CMDB. In another example, system like HP SA (Server Automation) can use the stored information to perform monitoring (e.g., operation, usage security and/or compliance), management, and/or remediation. In some embodiments, the monitoring, management, and/or remediation can be done in parallel that is not related to system (700). Thus, the compliance monitoring and/or remediation is not done using the system (700). In some embodiments, the topology may need to be rediscovered or inferred, as described herein, or simply because system (700) is informed to import the info back to system (700) or notified of the change. The discovery system therefore can track changes or notifications to instances and also reflect these in updates to the instances that it stores and tracks. That is, after provisioning some steps can be performed by external systems (e.g., systems other than system (700)). As a result, in order to maintain the ability of system (700) it can be important that the updates to the instances be also reflected into the system (700). Thus, the system (700) can rediscover the changes to the instances or the system (700) can be informed of the changes (i.e., notifications).

In some embodiments, the applications are deployed in a platform that takes over some or all of the management steps of the realized topology. For example, the application is deployed in a PaaS like Cloud Foundry, or other execution and management platform, where while system (700) can be used to deploy the application and/or the PaaS as well as its context (e.g. PaaS deployment on infrastructure and manifest generation and code deployment in PaaS). Then the PaaS can manage the realized topology (e.g. auto-scaling). When this happens, the system (700) may not be performing the changes to the realized topology. To continue to be relevant to manage the realized topology, the current solution described herein is needed (e.g., updates to the realized topology are tracked by or notified to system (700) by tracking them as updates to the realized topology imported (or synched) from cloud foundry).

The system (700) can include a user interface (702). The user interface (702) can be utilized to display information relating to the cloud system. In some embodiments, the user interface (702) can be utilized to input data relating to the cloud system. The system (700) can be utilized to visualize the inferred realized topologies as described herein. In some embodiments, the system (700) can be utilized to modify the inferred realized topologies. For example, modifying the inferred realized topologies can include: editing, correcting, and/or complementing the inferred realized topologies (e.g., utilizing LCM, policies (303), and/or other information relating to the inferred realized topologies). In some embodiments, the system (700) can be utilized to drive and/or load information from other systems and/or files of the inferred realized topologies. As described herein, the system (700) can also be utilized to manage the inferred realized topologies the same and/or similar way as a system would manage a realized topology and/or a discovered topology. In addition, the system (700) can enable selection of an LCM action. In some embodiments, complementing the topologies can include binding polices (303) to the topologies. For example, complementing the topologies can include binding policies (303) derived from policies on a data center to the same and/or similar node types of the topologies. That is, the discovered and/or inferred topologies can be updated by binding policies (303) to a number of nodes of the discovered and/or inferred topologies. Thus, discovered and/or inferred instances of these discovered and/or inferred topologies can be prescribed and managed by the system (700).

Furthermore, the system (700) can include options to draw changes to the topology, the relations, the dependencies, and/or the polices (303). The draw changes can be enacted on the realized topology by the system (700). For example, the draw changes can include an instruction to move a node, duplicate a topology, and/or retire a topology. In some embodiments, the system (700) can approve a remediation that was recommended by a recommendation engine. The options to draw changes to the topology, the relations, the dependencies, and/or the policies (303) can also include changing the code (i.e., not using a designer). In some embodiments, these changes can be made by YAML when the topologies are expressed with a TOSCA YAML profile.

The system (700) can include a catalog (704). In some embodiments, the catalog (704) can include a computer readable medium that can be utilized to store information relating to the cloud system. In some embodiments, the catalog (704) can be utilized to store information relating to deployed systems of the cloud system. Thus the realized topologies may not be initially provisioned by the system (700), but rather updated and/or managed at some point by a different system other than system (700).

The system (700) can include a policy based fulfillment, orchestration, and integration tool (706). The policy based fulfillment, orchestration, and integration tool (706) can include a number of policies (303) that can be utilized for deployment of services on the cloud system. As described herein, the policies (303) can be state and version policies (303) and/or compliance policies (303), among other policies (303). In some embodiments, the policies (303) are then applied (e.g., applied automatically, applied by complementing, etc.) the realized topologies that are not initially provisioned by the system (700).

The system (700) can include a service and instance repository (708). The service and instance repository (708) can include a computer readable medium that can be utilized to store information relating to a number of services and/or a number of instances from the cloud system. The system (700) can include a model repository (710). The model repository (710) can include a computer readable medium that can store information relating to application models (319) of the cloud system, topologies (302) of the cloud system, instances of the cloud system, environments of the cloud system, and/or desired environments of the cloud system.

The system (700) can include a discovery module (712) that can initiate an automated and/or manual discovery of a topology. As described herein, the discovery module (712) can discover a realized topology and/or an inferred realized topology of the system (700). The system (700) can include a reporting platform (714). The reporting platform (714) can be utilized to send reports of errors and/or reports of the cloud system status. The system (700) can include a common data warehouse (716). The common data warehouse (716) can include a computer readable medium that can be used to store data relating to the reporting platform (714). In some embodiments, the discovery module (712) can be notified of items to discover. For example, if there are changes to the topologies the discovery module (712) can be notified that there were changes implemented to the topologies and notified to discover the topologies. In some embodiments, the system (700) can also be notified of items to discover and then subsequently notify the discovery module (712) what items to discover.

In some embodiments, the system (700) is enabled by a separation of topology design, topology models, and topology templates from realized topology instances. The system (700) can manage a realized instance for which it does not have the model and/or the design. In addition, the system (700) can allow the realized topology to be imported, discovered, and/or modified from an external system and keep track of the realized topologies for managing the realized topologies.

Figure 8:
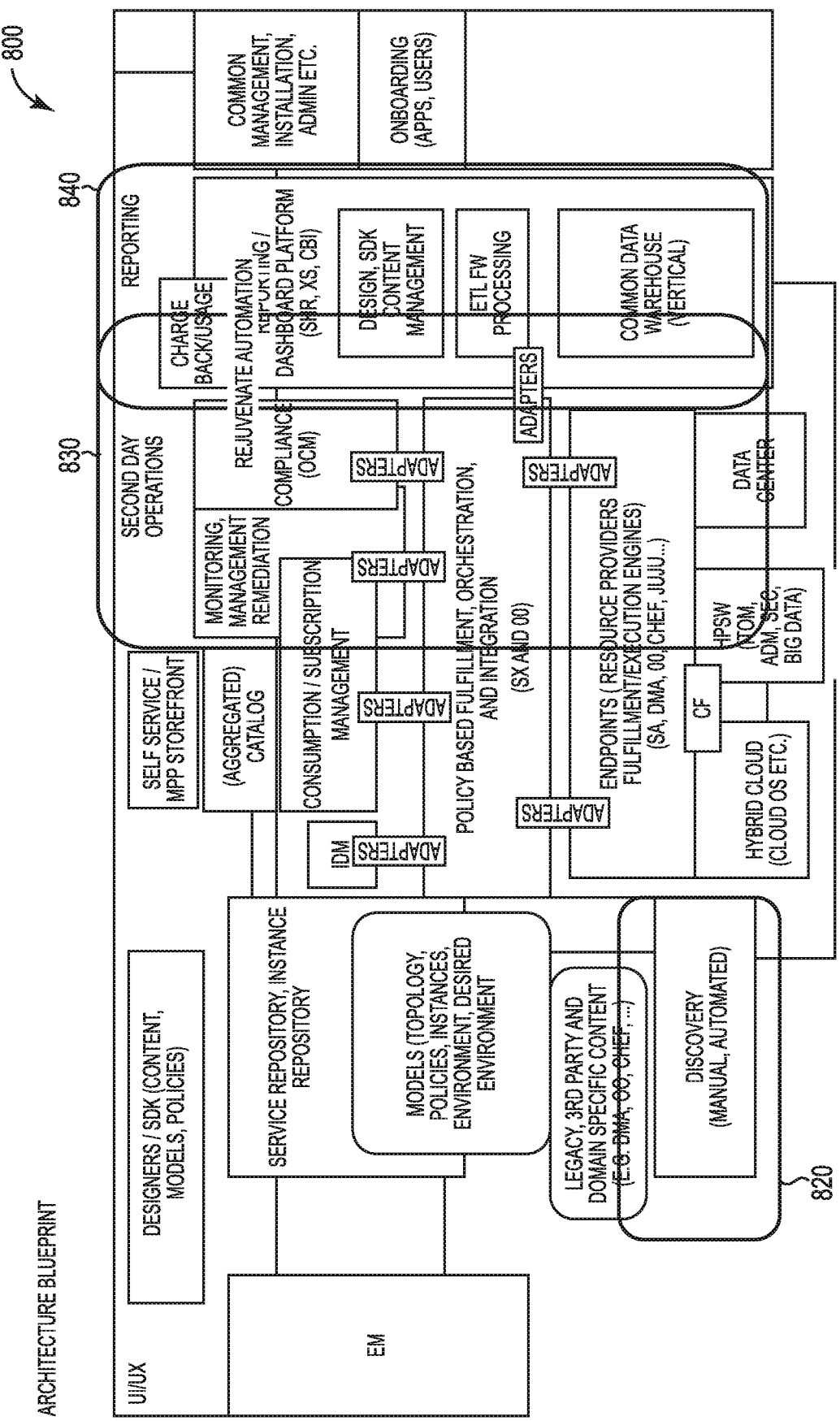
FIG. 8 is an example of a system, according to the present disclosure.

FIG. 8 is an example of a system (800) including components, platforms, and modules illustrated in FIG. 7, according to the present disclosure. The system (800) includes an example architecture of a cloud system as described herein. FIG. 8 is useful for an example method for discovering a topology not provisioned by the management broker (300). System (800) can be utilized in a similar manar as system (700).

As shown in FIG. 8, the system (800) can include a discovery portion (810). The discovery portion (810) can include the discovery module (712) as referenced in FIG. 7. The discovery portion (810) can include portions of the system (800) that are utilized to discover realized topologies and/or inferred realized topologies.

The system (800) includes a second day operations portion (820). The second day operations portion (820) is enabled by this subset of components. As described herein, the second day operations can include operations of a cloud system after development of the hardware, software, and/or logic. For example, the second day operations can include provisioning, using other management tools, or discovering topology provisioned by another to be managed by the management broker (300) as referenced in FIG. 3, and/or managing the cloud system. In some embodiments, as described herein, the system (800) can include a number of different parts including, but not limited to: modeling parts, design parts, provisioning then second day operation, reporting. Thus second day operation (e.g., what is performed after provisioning of a system) can now be performed by the system (800) even though the topologies were not provisioned by the system (800).

The system (800) can include a reporting portion (830). The reporting portion (830) of the system (800) can include elements of the system (800) that are utilized to report errors and/or provide cloud system analysis information.

Figure 9:
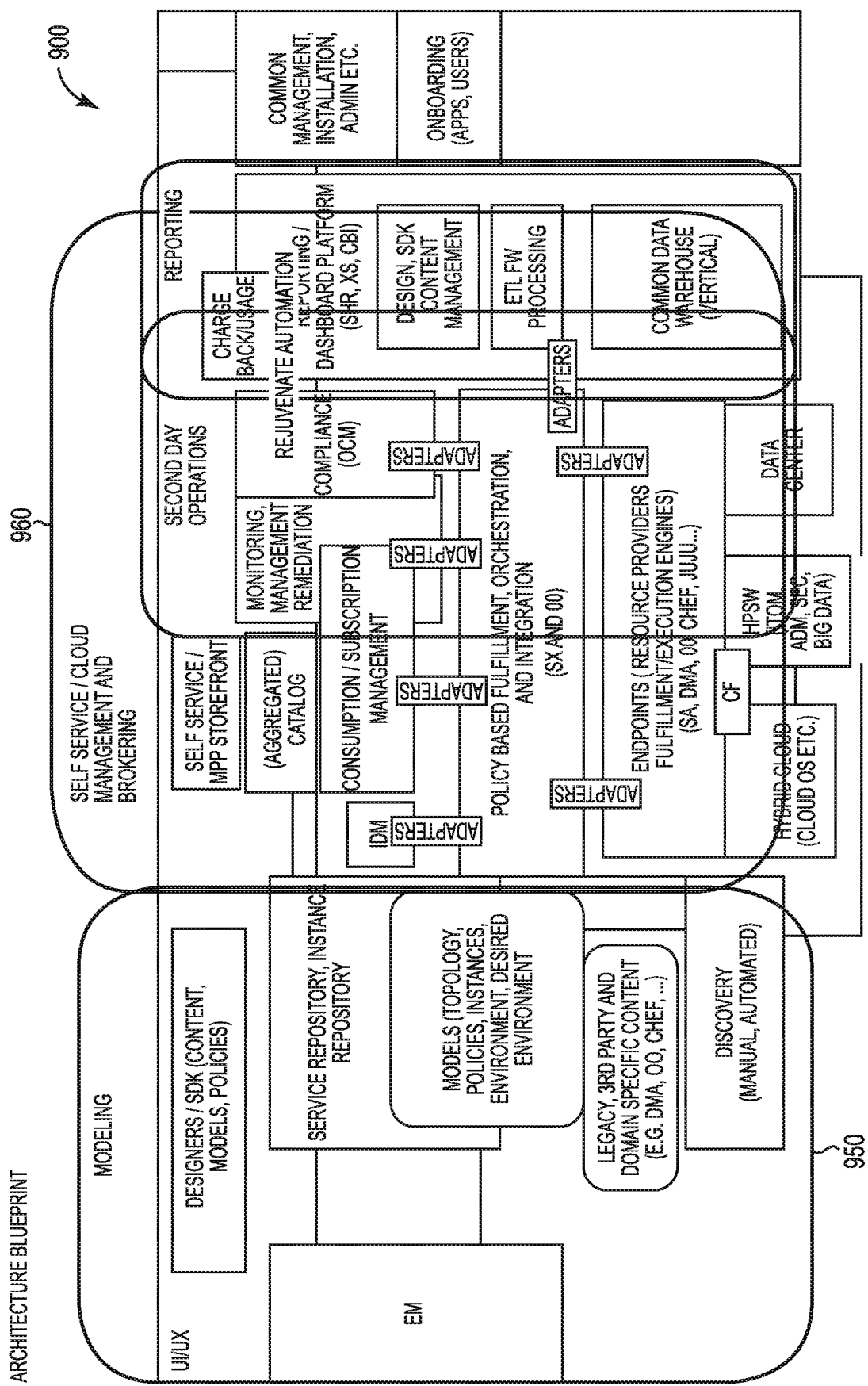
FIG. 9 is an example of a system, according to the present disclosure.

FIG. 9 is an example of an system (900), according to the present disclosure. The system (900) can include a modeling portion (940). The modeling portion (940) can include portions of the system (900) that includes elements of the system (900) that correspond to modeling of the cloud system represented by the system (900). The modeling portion (940) can include the service repository and/or instance repository (708), the discovery module (712), the model repository (710), and/or other elements of a cloud system that can be utilized for modeling the cloud system.

The system (900) can include a cloud management portion (950). The cloud management portion (950) can include elements of the system (900) that can be utilized to service, manage, provision, and/or broker the cloud system as described in connection with FIGS. 1-6.

Figure 10:
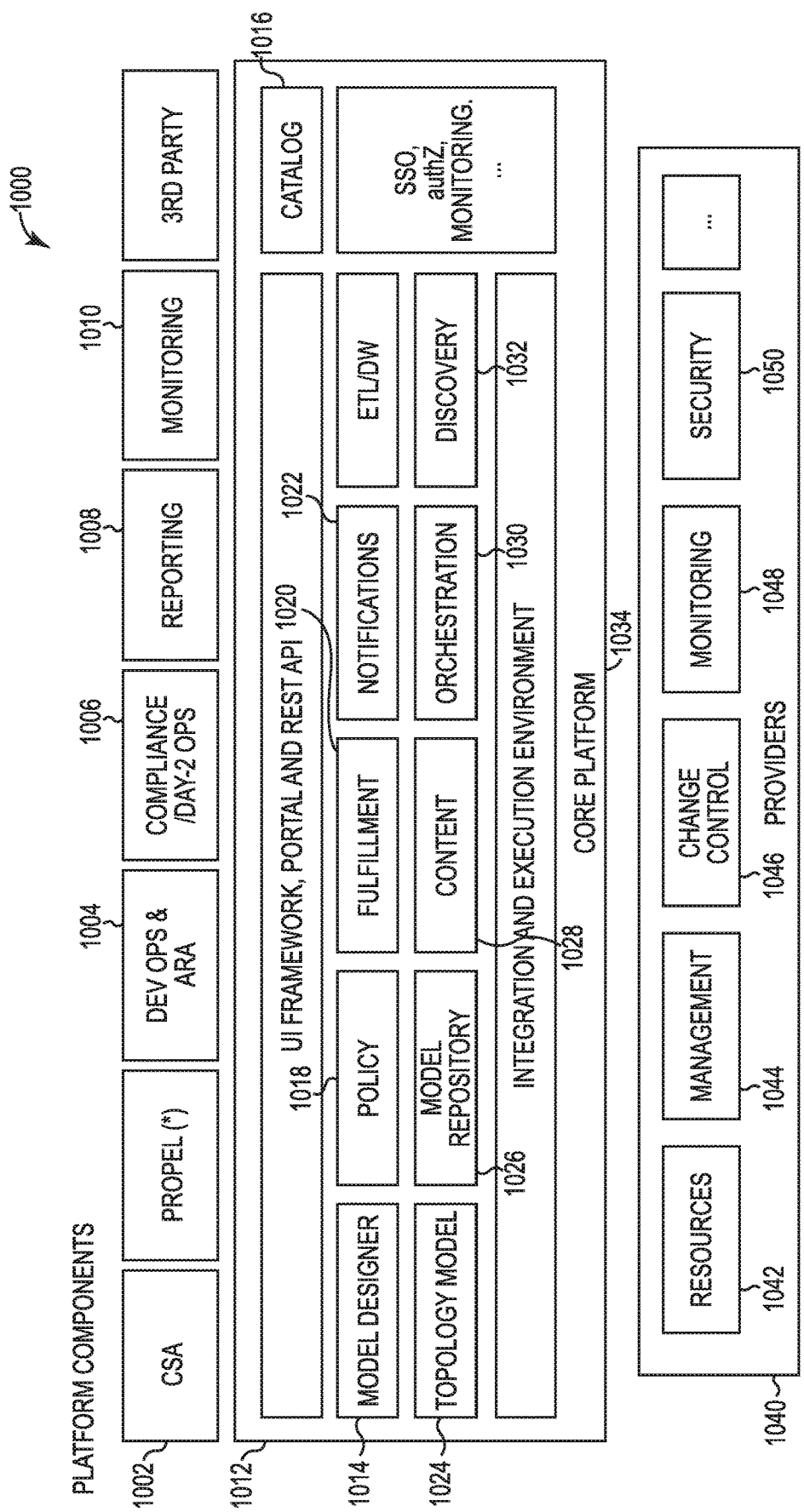
FIG. 10 is a block diagram showing an example platform of components that make up a topology of components associated with nodes of a topology, according to the present disclosure.

FIG. 10 is a block diagram showing an example platform (1000) of components, according to the present disclosure. The platform (1000) includes a plurality of components that can be utilized to provision and manage a cloud system. The platform (1000) can include components that are associated with a topology (302) of the cloud system as described in connection with FIGS. 1-6.

The platform (1000) can include a cloud control and management system for first day operation and management. The platform (1000) can include an integrated or stand-alone development and operations system (1004). The development and application release automation system (1004) that can facilitate the deployment of applications on suitable infrastructure for the stage (e.g., testing, pre-production, production) as well as associated monitoring and remediation.

In some embodiments, a plurality of management solutions can be viewed as applications on the platform (1000). For example, applications such as first day operation and management such as CSA or applications such as second day operations that are typically done in data center can now be moved and shared between the data center and cloud networks.

The platform (1000) can include an integrated or stand-alone compliance and second day operations system (1006). That is, the second day application can be integrated with application (1002) or operations system (1004) to provide the ability to also manage instances that have not been generated by the application (1002) or the operations system (1004) or it can be built on the same platform but used in stand-alone mode. As described herein, the compliance of an application or system can integrated into a number of policies (303). In addition, the second day operations can be operations after development of hardware and/or software applications.

The platform (1000) can include an integrated or stand-alone reporting system (1008). The reporting system (1008) can report errors that occur in the cloud system. In some embodiments, the reporting system (1008) can generate reports that include information on the operation and functionality of the cloud system.

The platform (1000) can include an integrated or stand-alone monitoring system (910). The monitoring system (1010) can be utilized to monitor performance and status of deployed services of the cloud system. As described herein, the deployed services may have been provisioned and managed or remediated by the application 1002 or by a different system. The monitoring system (1010) can be utilized to monitor a variety of relationships of the cloud system, as described herein.

The platform (1000) can include a core platform (1012) that can include a plurality of features for providing services via the cloud system such as described in connection with FIGS. 1-6. The core platform (1012) can include a user interface (1014). The user interface (1014) can be utilized to display reports from the reporting system (1008) and/or make changes to the platform (1000). The core platform (1012) can include a catalog (1016). The catalog (1016) can include a computer readable medium that can store individual designs, provisions, deploys, and manages such a cloud service that appropriately consists of a number of services, applications, platforms, or infrastructure capabilities deployed, executed, and managed in a cloud environment. As described herein, these designs may then be offered to user who may order, request, and subscribe to them from the catalog (1016).

The core platform (1012) can include a policy service (1018) that can manage, process, and store/bind a number of policies (303). The number of policies (303) can include stage and version policies, provider selection policies, security policies, access control policies, monitoring policies, event processing policies, notification policies, remediation policies, and/or compliance policies, among various other policies that can be managed, process, and/or stored/bound. The core platform (1012) can include a fulfilment engine service (1020). The fulfilment engine (1020) can include a number of methods for fulfilling requests, provisioning, and/or updating requests of the cloud system while also following the guidance of the policies that apply.

The core platform (1012) can include a notification service (1022). The notification service (1022) can include an event handler and can process events (e.g., process events with corresponding policies) to extract incidents and send the incident depending on policies to notify a user. In some embodiments, the notification service (1022) can notify with remediation recommendations. In some embodiments, the notification service (1022) can notify with a remediation menu to remediate. In some embodiments, the notification service (1022) can send notifications to accept or to remediate differently than the remediation recommendations. Furthermore, in some embodiments, the notification service (1022) can notify a user that a remediation has taken place. The notifications service (1022) can include a computer readable medium to store notifications and/or reports generated by the reporting system (1008) such as described in FIGS. 1-6. The notifications database (1022) is a logical system repository of realized topologies (314) and/or inferred realized topologies, and may be any form of data repository.

The core platform (1012) can include a topology model (1024). The topology model (1024) can include a model representation of a number of topologies (302). The topology model (1024) can be utilized to provision and/or manage the cloud system. The core platform (1012) can include a model repository (1026). In some embodiments, the model repository (1026) can be a model and instance repository to store system models, topologies (302), and/or instances. The model repository (1026) can include a computer readable medium that can be utilized to store a number of system models and/or topologies (302).

The core platform (1012) can include a content repository (1028). In some embodiments, the content repository (1028) can be utilized to design topology services and/or policies. In addition, the content repository (1028) can be utilized to implement resource providers or LCMA. The content repository (1028) can include a computer readable medium that can be utilized to store content from the cloud system. The core platform (1012) can include an orchestration system (1030). The orchestration system (1030) can be utilized to provision and/or manage services provided by the cloud system such as described in connection with FIGS. 7-9.

The core platform (1012) can include a discovery system (1032). The discovery system (1032) can be utilized to discover topologies (302) for the cloud system. In addition, the discovery system (1032) can be utilized in discovering realized topologies and/or inferred realized topologies as described herein in connection with FIGS. 7-9 as well as changes performed by external systems to existing instances. The core platform (1012) can include an integration and execution environment (1034). The integration and execution environment (1034) can include an execution platform that can be utilized to execute services on the cloud system as well as the applications and services running in/on the platform (1000).

The platform (1000) can include a provider portion (1040). The provider portion can include resource provider policies (308-1) as described herein that are any policies associated with a number of resource providers' offerings that guide the selection of a number of resources. The provider portion (1040) can include resources (1042), management (1044), change control (1046), monitoring (1048), security (1050), among other providers. The resources (1042) can include networking resources that can provide services via the cloud system. The management (1044) can be utilized to manage the provisioning of services on the cloud system. The management (1044) can be performed by third party offering in FIG. 3. The change control (1046) can be utilized for manual changes to the cloud system and/or manual changes to the topologies (302). Monitoring (1048) can include networking monitors to monitor provisioning and deployment of resources on the cloud system. Security (1050) can include stand-alone or third party network security elements that can be used to prevent a variety of security risks.

The systems and methods as described herein make it possible to manage cloud services that are provisioned and/or managed differently. For example, the systems and methods as described herein can provide for instantiating, provisioning, and/or managing a cloud system for second day operation without first day operation. That is, the systems and methods described herein provide for instantiating, provisioning, and/or managing a cloud system when the applications were developed by the manager and managed by the manager. In addition, the systems and methods described herein provide for instantiating, provisioning, and/or managing a cloud system when the applications were not developed by the manager and the topologies are inferred topologies and/or inferred realized topologies that are discovered as described herein. Furthermore, the systems and methods described herein provide for instantiating, provisioning, and/or managing a cloud system when the applications were developed by a manager, but the cloud service is managed by a different management broker (300) as referenced herein.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed is:
1. A method comprising:
identifying, by a first cloud service management system comprising a hardware processor, a first cloud service deployed and managed by a second cloud service management system that is different from the first cloud service management system, the first cloud service managed by the second cloud service management system based on provisioning and modifying, of computing resources for the first cloud service;
discovering, by the first cloud service management system, an existing realized topology of the first cloud service as an inferred realized topology for the first cloud service management system,
wherein the first cloud service is an instantiation of the existing realized topology,
wherein the second cloud service management system is configured to manage and change the existing realized topology based on examined relationships of the first cloud service,
wherein the existing realized topology comprises a plurality of nodes representing a plurality of computing resources and edges between nodes of the plurality of nodes, the edges representing relationships between respective computing resources of the plurality of computing resources, and
wherein a policy is associated with the inferred realized topology;
defining a lifecycle management action (LCMA) within a second cloud service defined by the inferred realized topology; and
managing, by the first cloud service management system, the second cloud service, the managing of the second cloud service comprising executing the LCMA on the second cloud service utilizing the first cloud service management system responsive to a detected event and according to the policy associated with the inferred realized topology, the LCMA comprising updating the inferred realized topology by the first cloud service management system.

2. The method of claim 1, wherein the managing of the second cloud service defined by the inferred realized topology is part of second day operations of the first cloud service management system.

3. The method of claim 1, comprising associating, by the first cloud service management system, a plurality of policies with the inferred realized topology, the plurality of policies comprising the policy that caused the executing of the LCMA on the second cloud service.

4. The method of claim 3, comprising adding, by the first cloud service management system, a plurality of LCMAs to the inferred realized topology, the plurality of LCMAs comprising the LCMA executed on the second cloud service.

5. The method of claim 3, wherein associating the plurality of policies with the inferred realized topology is performed by at least one of:
receiving a modification via a graphical user interface; or
writing a modification to the inferred realized topology using code.

6. The method of claim 1, wherein the inferred realized topology is discovered based on:
a knowledge of deployed systems in a domain;
relationships between the deployed systems in the domain; and
policies specific to node types in the domain.

7. The method of claim 1, comprising defining a further LCMA to be performed by the first cloud service management system within the second cloud service defined by the inferred realized topology, the further LCMA comprising at least one of: a provider selection process, a placement provisioning or moving process, an operational monitoring process, a security monitoring process, a usage monitoring process, or a compliance monitoring process.

8. The method of claim 1, comprising:
converting the inferred realized topology into an execution plan, the execution plan comprising executable logic for instantiating a further cloud service based on the inferred realized topology,
wherein instantiating the further cloud service is guided by policies associated with the inferred realized topology.

9. The method of claim 8, comprising modifying, monitoring, and instantiating the inferred realized topology based on the execution plan.

10. The method of claim 1, wherein the inferred realized topology comprises:
a plurality of nodes representing computing resources, and
edges between nodes of the plurality of nodes in the inferred realized topology representing respective relationships between the computing resources represented by the inferred realized topology.

11. The method of claim 1, wherein discovering the inferred realized topology comprises examining relationships of deployed systems of the first cloud service that is the instantiation of the existing realized topology.

12. A first cloud service management system comprising:
a processor; and
a non-transitory storage medium storing instructions executable on the processor to:
discover an existing realized topology of a first cloud service as an inferred realized topology for the first cloud service management system,
wherein the existing realized topology is to be provisioned and changed by a second cloud service management system that is different from the first cloud service management system,
wherein the first cloud service is an instantiation of the existing realized topology,
wherein the second cloud service management system is configured to manage and change the existing realized topology based on examined relationships of the first cloud service, and
wherein the existing realized topology comprises a plurality of nodes representing a plurality of computing resources, and edges between nodes of the plurality of nodes, the edges representing relationships between respective computing resources of the plurality of computing resources;
associate a lifecycle management action (LCMA) and a policy with the inferred realized topology, the LCMA to be performed within a second cloud service defined by the inferred realized topology; and
responsive to a detected event and according to the policy associated with the inferred realized topology, manage the second cloud service, the managing comprising executing the LCMA on the inferred realized topology to update the inferred realized topology.

13. The first cloud service management system of claim 12, wherein the instructions are executable on the processor to receive an update of the existing realized topology.

14. The first cloud service management system of claim 12, wherein the instructions are executable on the processor to execute actions that are guided by policies on the inferred realized topology.

15. The first cloud service management system of claim 12, wherein the inferred realized topology comprises:
a plurality of nodes representing computing resources, and
edges between nodes of the plurality of nodes in the inferred realized topology representing respective relationships between the computing resources represented by the inferred realized topology.

16. The first cloud service management system of claim 12, wherein discovering the inferred realized topology comprises examining relationships of deployed systems of the first cloud service that is the instantiation of the existing realized topology.

17. A non-transitory computer readable storage medium comprising instructions that upon execution cause a first cloud service management system to:

discover an existing realized topology of a first cloud service as an inferred realized topology for the first cloud service management system, wherein the existing realized topology is to be provisioned and changed by a second cloud service management system that is different from the first cloud service management system, wherein the first cloud service is an instantiation of the existing realized topology, wherein the second cloud service management system is configured to manage and change the existing realized topology based on examined relationships of the first cloud service, wherein the existing realized topology comprises a plurality of nodes representing a plurality of computing resources and edges between nodes of the plurality of nodes, the edges representing relationships between respective computing resources of the plurality of computing resources, and wherein the first cloud service is to be managed by the second cloud service management system based on provisioning and modification of computing resources for the first cloud service;

associate a lifecycle management action (LCMA) and a policy with the inferred realized topology, the LCMA to be performed within a second cloud service defined by the inferred realized topology; and responsive to a detected event and according to the policy associated with the inferred realized topology, manage the second cloud service, the managing of the second cloud service comprising executing the LCMA on the inferred realized topology to update the inferred realized topology.

18. The non-transitory computer readable storage medium of claim 17, wherein the instructions upon execution cause the first cloud service management system to edit the inferred realized topology using program code to add details and elements to the inferred realized topology.

19. The non-transitory computer readable storage medium of claim 17, wherein the instructions upon execution cause the first cloud service management system to edit the inferred realized topology using program code to associate the LCMA and the policy with the inferred realized topology.

20. The non-transitory computer readable storage medium of claim 17, wherein discovering the inferred realized topology comprises examining relationships of deployed systems of the first cloud service.

* * * * *